June 13, 1961 C. J. VAN DALEN 2,988,596

TELEGRAPH SYSTEM WITH AUTOMATIC REPETITION OF MUTILATED SIGNALS

Filed April 8, 1958 13 Sheets-Sheet 1

INVENTOR.
C. J. VAN DALEN
BY Hugh A. Kirk
ATT'Y

June 13, 1961 C. J. VAN DALEN 2,988,596

TELEGRAPH SYSTEM WITH AUTOMATIC REPETITION OF MUTILATED SIGNALS

Filed April 8, 1958

13 Sheets-Sheet 2

INVENTOR.
C. J. VAN DALEN

BY Hugh A. Kirk

ATT'Y.

June 13, 1961 C. J. VAN DALEN 2,988,596

TELEGRAPH SYSTEM WITH AUTOMATIC REPETITION OF MUTILATED SIGNALS

Filed April 8, 1958

13 Sheets-Sheet 3

INVENTOR.
C. J. VAN DALEN
BY Hugh A. Kirk
ATT'Y.

June 13, 1961 C. J. VAN DALEN 2,988,596

TELEGRAPH SYSTEM WITH AUTOMATIC REPETITION OF MUTILATED SIGNALS

Filed April 8, 1958 13 Sheets-Sheet 4

INVENTOR.
C. J. VAN DALEN
BY Hugh A Kirk
ATT'Y.

INVENTOR.
C.J. VAN DALEN
BY Hugh A Kirk
ATT'Y.

June 13, 1961 C. J. VAN DALEN 2,988,596

TELEGRAPH SYSTEM WITH AUTOMATIC REPETITION OF MUTILATED SIGNALS

Filed April 8, 1958 13 Sheets-Sheet 6

INVENTOR.
C. J. VAN DALEN
BY
Hugh A Kirk
ATT'Y.

INVENTOR.
C. J. VAN DALEN
BY Hugh A. Kirk
ATT'Y.

INVENTOR.
C.J. VAN DALEN
BY Hugh A. Kirk
ATT'Y.

*INVENTOR.*
C. J. VAN DALEN
*BY* Hugh A. Kirk
ATT'Y.

INVENTOR.
C. J. VAN DALEN
BY Hugh A. Kirk
ATT'Y.

June 13, 1961 C. J. VAN DALEN 2,988,596

TELEGRAPH SYSTEM WITH AUTOMATIC REPETITION OF MUTILATED SIGNALS

Filed April 8, 1958 13 Sheets-Sheet 11

INVENTOR.
C. J. VAN DALEN
BY
Hugh A. Kirk
ATT'Y.

June 13, 1961 C. J. VAN DALEN 2,988,596

TELEGRAPH SYSTEM WITH AUTOMATIC REPETITION OF MUTILATED SIGNALS

Filed April 8, 1958 13 Sheets-Sheet 12

INVENTOR.
C. J. VAN DALEN
BY Hugh A. Kirk
ATT'Y.

INVENTOR.
C. J. VAN DALEN
BY Hugh A. Kirk
ATT'Y.

2,988,596

TELEGRAPH SYSTEM WITH AUTOMATIC REPETITION OF MUTILATED SIGNALS

Christiaan Johannes van Dalen, Leidschendam, Netherlands, assignor to De Staat der Nederlanden, Ten Deze Vertegenwoordigd Door de Directeur-Generaal der Posterijen, Telegrafie en Telefonie, The Hague, Netherlands Filed Apr. 8, 1958, Ser. No. 727,177
Claims priority, application Netherlands Apr. 13, 1957
27 Claims. (Cl. 178—23)

This invention relates to a telegraphic system with means for automatic repetition of signals detected to have been mutilated in transit. More particularly, it deals with a two-way synchronous or asynchronous, single or multi-channel communication system, in which a request for repetition of a mutilated signal in one channel is the retransmission only of the last or previous correctly received signal, and also in which every alternate signal in a sequence of identical signals in one channel is replaced by a special service signal to prevent a double signal from being considered as a request for repetition or indication of a mutilation.

Known error detection and automatic repetition systems use a code having a constant mark-space ratio, or a frequency shift method as that disclosed in the copending U.S. patent application of H. C. A. Van Duuren for "Frequency Signal Telegraph Communication System" Serial No. 600,001 filed July 25, 1956. These type systems involve at least one service signal for requesting the repetition of a mutilated signal. Code signals are transmitted and received in both directions between cooperating stations, the operation being stepwise and every signal taking up an interval of a step. The repetition of mutilated letters in such systems is effected under the control of repetition devices on both collaborating stations, the operation of the repetition devices involving the transmission back and forth of said service signal, which results in a considerable loss of time.

It has been proposed to remove this objectionable feature by classifying the steps of the repetition cycle during which characters are emitted, such as in the system disclosed in the copending U.S. patent application of C. J. Van Dalen and H. C. A. Van Duuren for "Arhythmic Telecommunications System," Serial No. 600,028, filed July 25, 1956. The procedure in said latter application results, for instance, in the necessity for two service signals in the case of a two-step cycle. Multiple step cycles may be introduced with a view to coping with larger propagation times.

Systems of this general type suffer from the defect, that a temporary loss of correction may result in double printing of a character, if, on the resumption of the corrected condition, mutual rotation of the receiver with respect to the transmitter over a complete cycle should have taken place during the temporarily uncontrolled state; and in such an eventuality, a character will have been simultaneously lost in the inverse way of transmission.

This invention is an improvement over the copending U.S. patent applications of H. C. A. Van Duuren for "Frequency Signal Telegraph Communication System," Serial No. 600,001, and C. J. Van Dalen and H. C. A. Van Duuren for "Arhythmic Telecommunication System," Serial No. 600,028, both filed on July 25, 1956, and having a common assignee with this application.

It is an object of this invention to provide a communication system in which service signals are not required for requesting the repetition of a mutilated signal; thus the service signals may be utilized for other purposes, such as a procuration signal in case of a sequence of identical signals and a master synchronizing signal in case of multi-channel transmission.

Another object of this invention is to provide an automatic error detection and correction system for multi-frequency shift transmission systems as described in the second above identified copending patent application Serial No. 600,028 without using group classifying signals as is required in that system or the use of numbering systems and counters at both stations.

Another object of this invention is to provide a two-way communication system in which either of the two stations can become a master station by initiating a message, the other station becoming the slave station, including the extension of this principle to a network of stations and the selection of one of a plurality of stations therein.

Another object is to provide an automatic error correction device for a telecommunication system in which the time available for transmission of the message is increased compared to the repetition cycle for error correction purposes of previously known systems.

Another object of this invention is to provide such a telecommunication system between stations in which the loss of time involved in the transmission and re-transmission of a service signal between the repetition devices at both stations is reduced by shortening the repetition cycle to the duration of one signal, and providing a system in which the attendant's duties at each station are simplified.

Another object is to produce a multi-channel telecommunication system having an automatic error detection and correction device in which loss of synchronism between stations can never result in a loss or a doubling of the signal characters, in which it is impossible that letters are interchanneled, and in which the channels are independent one from the other.

Another object is to produce such a telecommunication system with an automatic error detection and correction device in which one station can transmit the same or a series of messages to several other stations in view of the shortening of the repetition cycle.

Generally speaking, this invention relates to either a synchronous or asynchronous two-way communication system between at least two stations having an automatic error correction device. Each station comprises a transmitter and receiver, including means at its transmitter to convert every alternate letter signal in a sequence of identical letter signals into a special service signal Δ, means at its receiver to replace such a special service signal Δ by the previous letter signal received, means at the transmitter to repeat the previously transmitted signal to request a repetition of the last received signal from another station, and means at its receiver responsive to the second reception of the same signal to cause its associated transmitter to repeat its last transmitted signal. If, during the transmission of a special service signal Δ between a station A and a station B, said special service signal Δ is not correctly received at station B, the receiver at station B instructs the transmitter at station B to replace the signal it was about to transmit with the signal that was just previously correctly received from station A. The receiver at station A suppresses this repeated signal; however, interpreting it as a request for repetition for said incorrectly received service signal Δ. The transmitter at station A again re-transmits the incorrectly received service signal Δ until it is correctly received at station B. Thus the above described operation of repeating a last received signal for requesting repetition of a mutilated letter signal occurs when any signal is not correctly received, whether it be a special service signal Δ or just an ordinary letter signal.

Although the system of this invention may be used in many types of error detection and automatic repetition or correction systems, whether the signals therein are of frequency shift modulated type as disclosed in the above mentioned two copending applications or not, the system of this invention has been described by way of example for a frequency shift system, in which a standard five-unit telegraph type code is converted into a three-unit code composed of four different frequencies, so that adjacent units of the three-unit code always have a different frequency, and the receiver counts the number of changes in frequency in order to detect whether or not mutilation has occurred in the transmission of each signal. The conversion of the five-unit code into such a three-unit four-different frequency code, may be performed in the transmitter at each station by first converting the five-unit code into a six-unit or element code in which each adjacent pair of successive pairs of units of the six-unit code are different, and then converting these different pairs into the four different frequencies. In this manner of conversion there are provided 36 different combinations of the four different frequencies for the three-unit multi-frequency code, thus permitting four extra combinations, over and above the 32 combinations of the original five-unit code, for the production of special type service signals. In order to insure that one signal of three multi-frequency elements will not interfere with the next signal of three multi-frequency elements, a space may be provided during which time the counter provided at each receiver may re-set for counting the next three changes in frequency corresponding to the correct reception of the next received three-element signal. By such a space between signals, the last element of one code signal need not necessarily be different from the first element of the next three-element code signal.

In order to increase the propagation time relative to the time required for the repetition cycle for automatic correction, the symbols or letters may be grouped or paired for transmission and reception so that a repetition cycle only occurs between groups or pairs of symbols or letters, which groups or pairs may either be transmitted successively in time or simultaneously. These pairs or groups of symbols or letters may comprise two successive three element multi-frequency signals spaced by an intermediate element to form a seven element multi-frequency signal, and the intermediate element may have more than one variation, that is, "varioplex" element, so as to include a selection indication for more than one subscriber for that signal. Then also by adding another or eighth element even more subscriber's selections can be obtained, forming thereby additional "varioplex" type signals.

Systems employing double symbol signals may be either synchronous or asynchronous in which the station initiating the signal is the master and that receiving the initiated signal is the slave. Switching means may be provided for making either station a master or for making the system a synchronous system with only a virtual or etherial master-slave relationship between the stations.

Furthermore, the double symbol may be composed of a pair of seven element signals in which the first, second, third, etc., elements of both signals are considered as element pairs of a combined and different seven element code or "twinplex" signal, so that corresponding elements of each symbol of the double symbol are transmitted simultaneously. To further increase the propagation time for such twinplex signals, they may be employed in multi-channel systems having groups of channels in which one double symbol signal of each group may be used for synchronization and selection of one of a plurality of subscribers to that channel, that is, one symbol being a special signal and the other symbol of the pair being for a varioplex type subscriber selection. Also, these synchronizing and selecting double symbol signals may be rotated through each channel position in a group of $n$-channels so that such a symbol occurs only once in each group, and only once in each channel every $n+1$ number of groups.

These systems are also adaptable to network operations in which a special service signals Δ may be employed with a letter to make a double symbol signal for calling a given station in the network.

The above mentioned and other features and objects of this invention and the manner of attaining them will become more apparent and the invention itself will be best understood by reference to the following description of embodiments of the invention taken in conjunction with the accompanying drawings, wherein.

Figure 3:
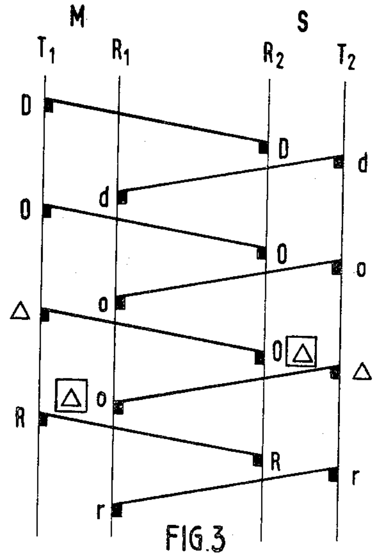
FIG. 3 is a schematic time diagram of an asynchronous communication system with a repetition cycle of one signal similar to FIG. 1, with no errors or disturbances occurring in transmission between the master station and the slave station.
Figure 4:
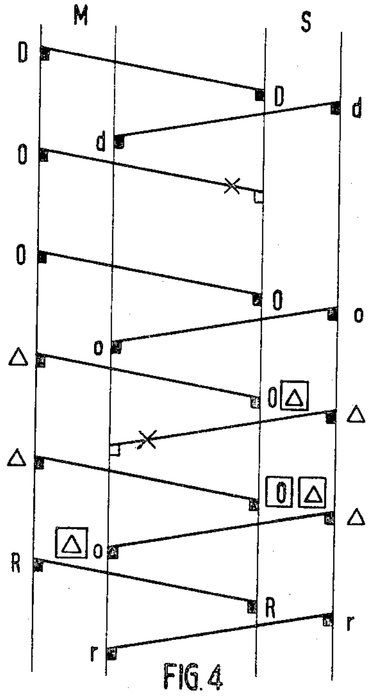
FIG. 4 is a schematic diagram of an asynchronous communication system similar to FIG. 2, with errors or disturbances occurring between the master station and the slave station.
Figure 5A:
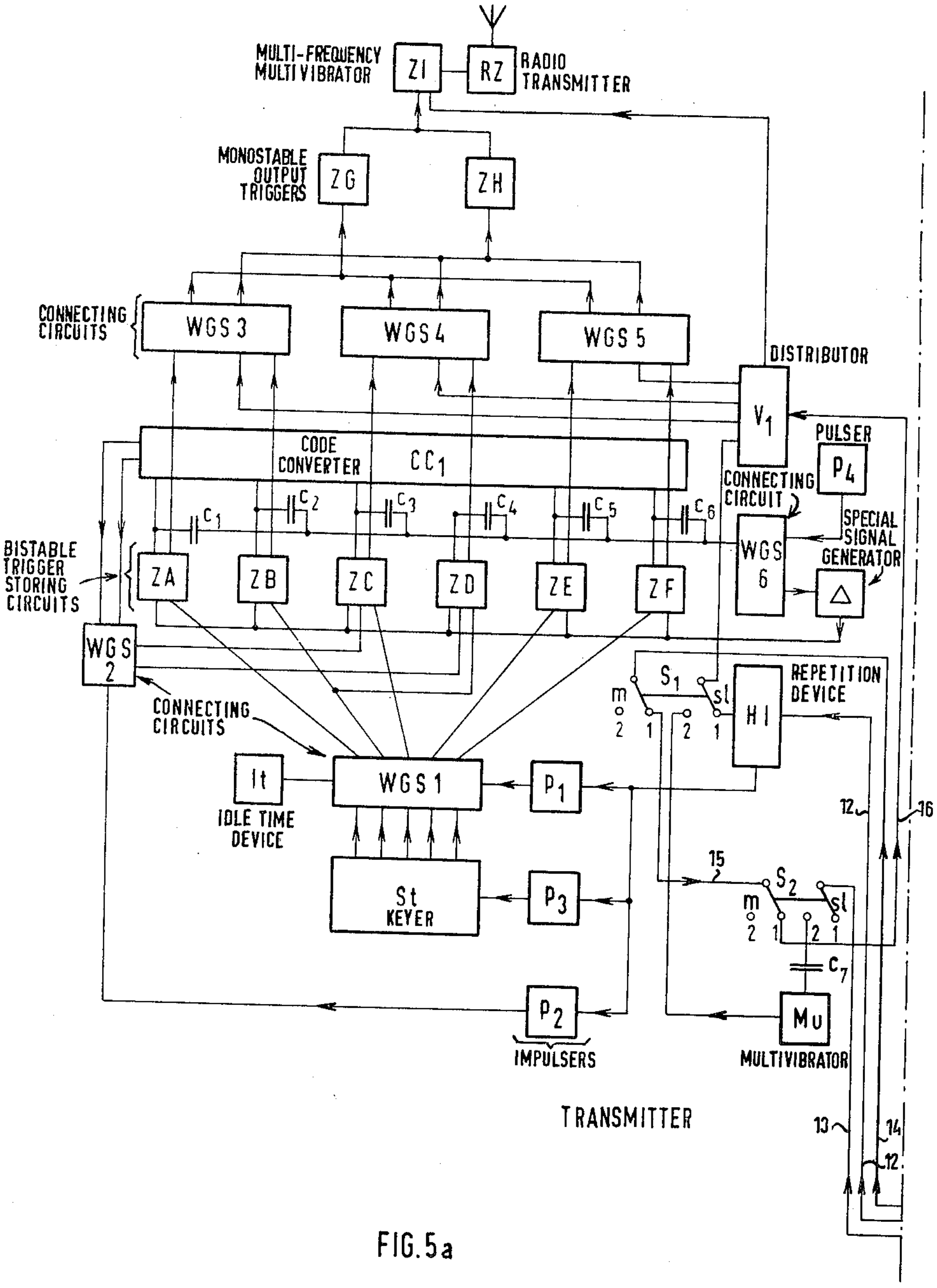
Figure 5B:
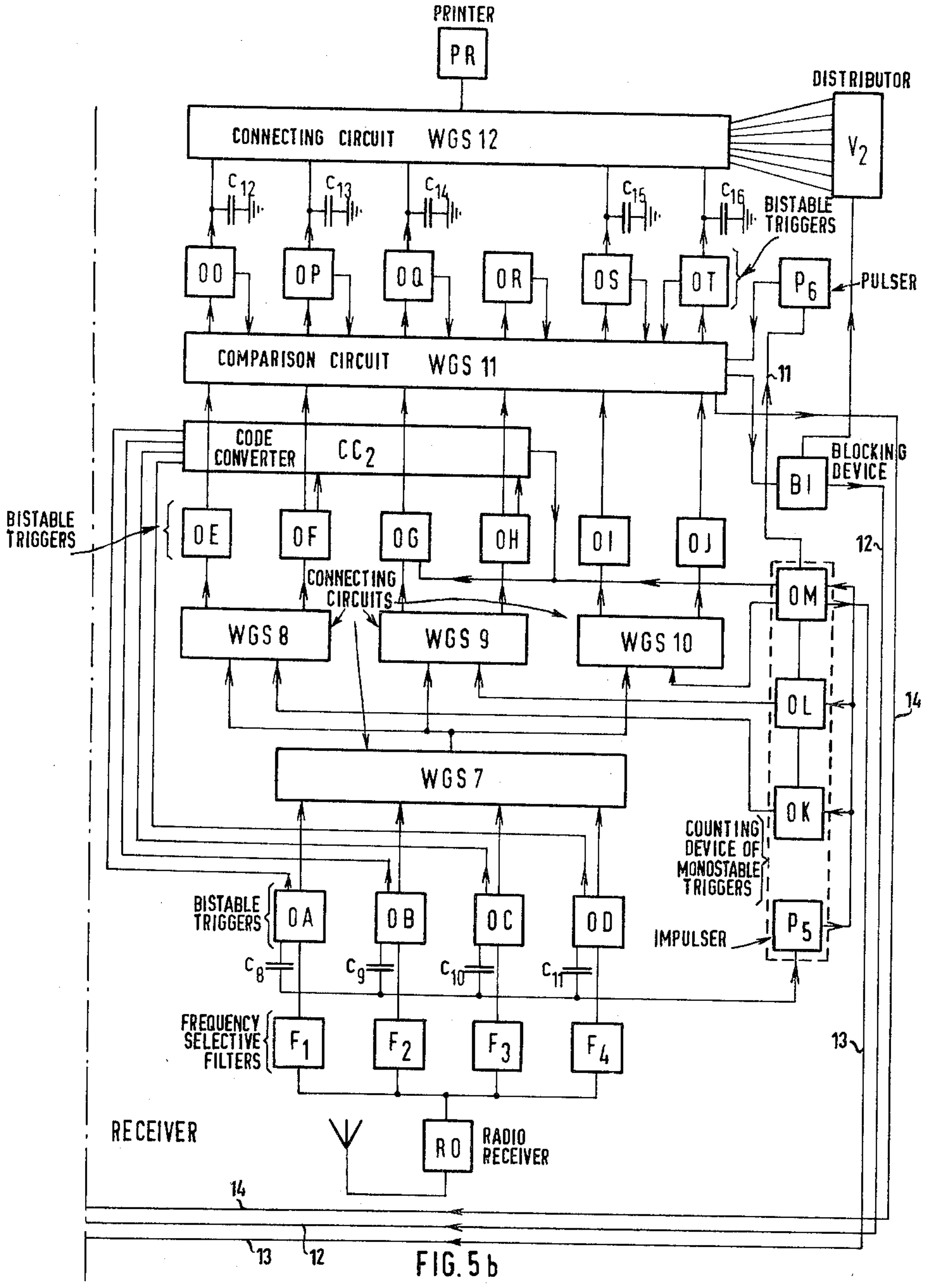
Figure 6:
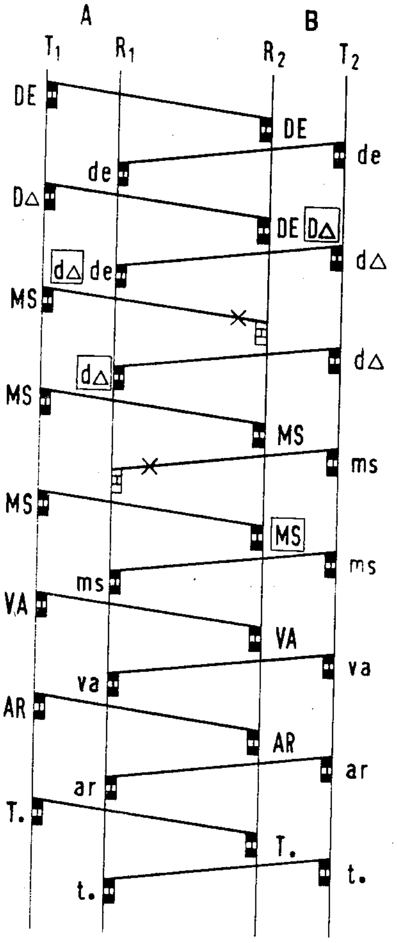
Figure 7:
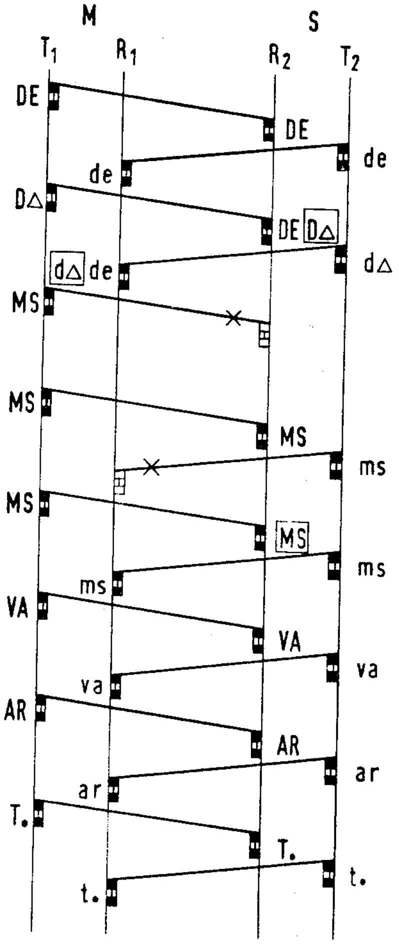
Figure 8:
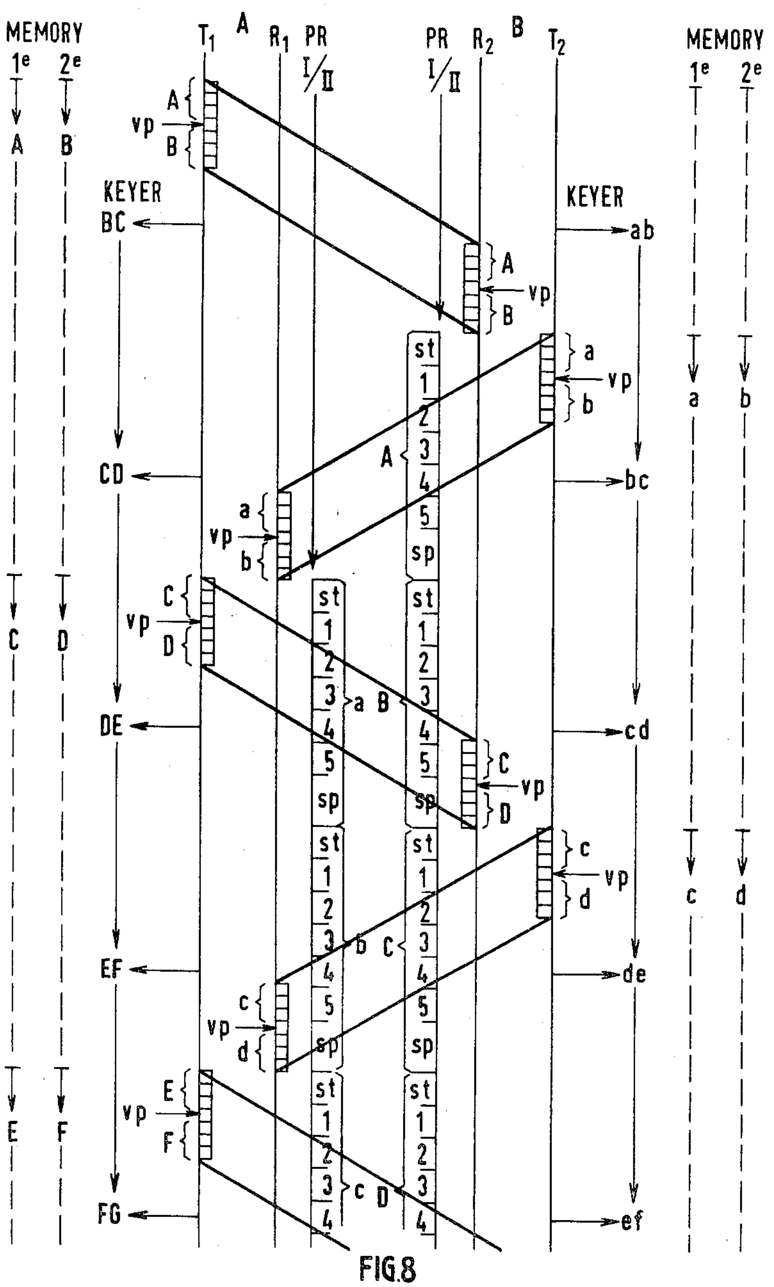
Figure 9A:
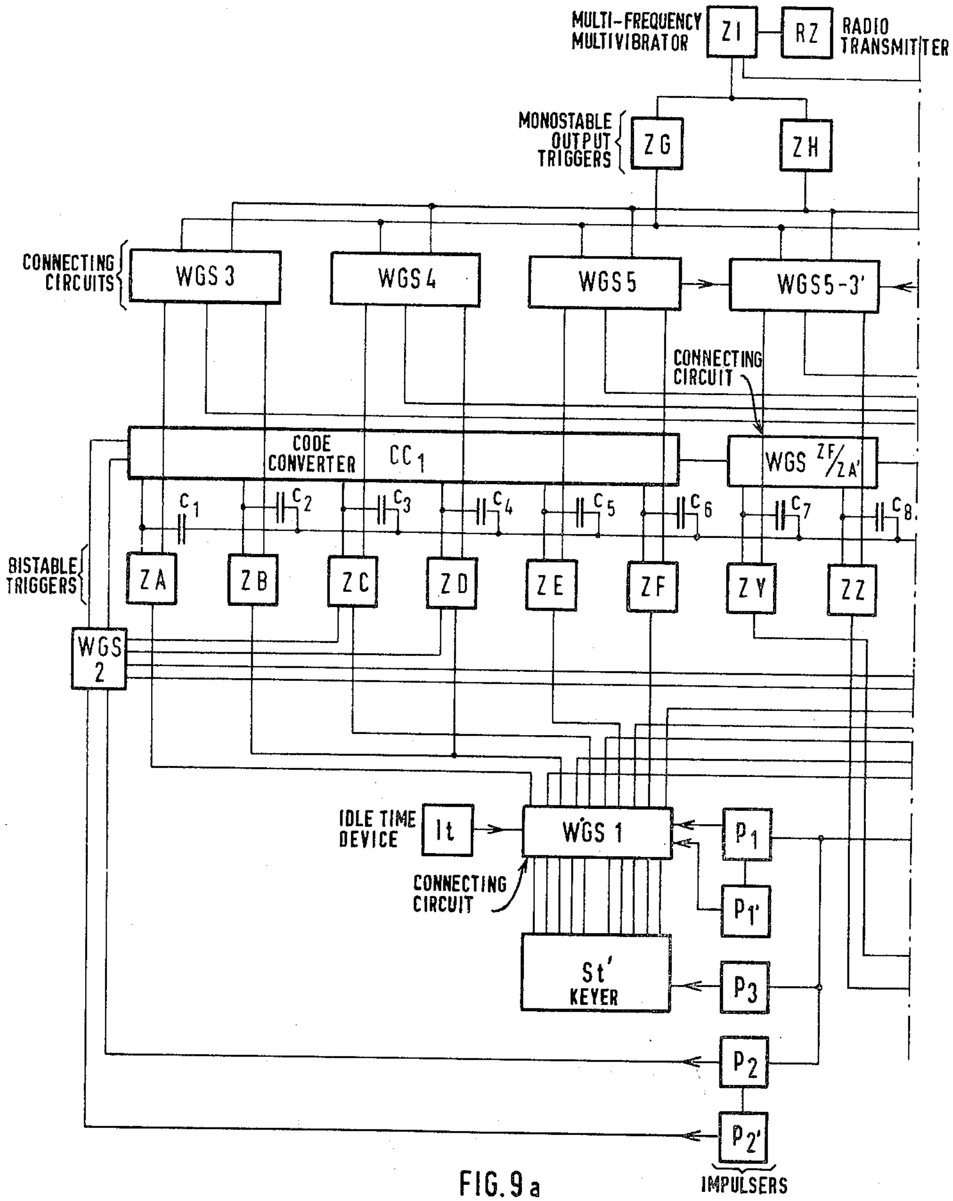
Figure 9B:
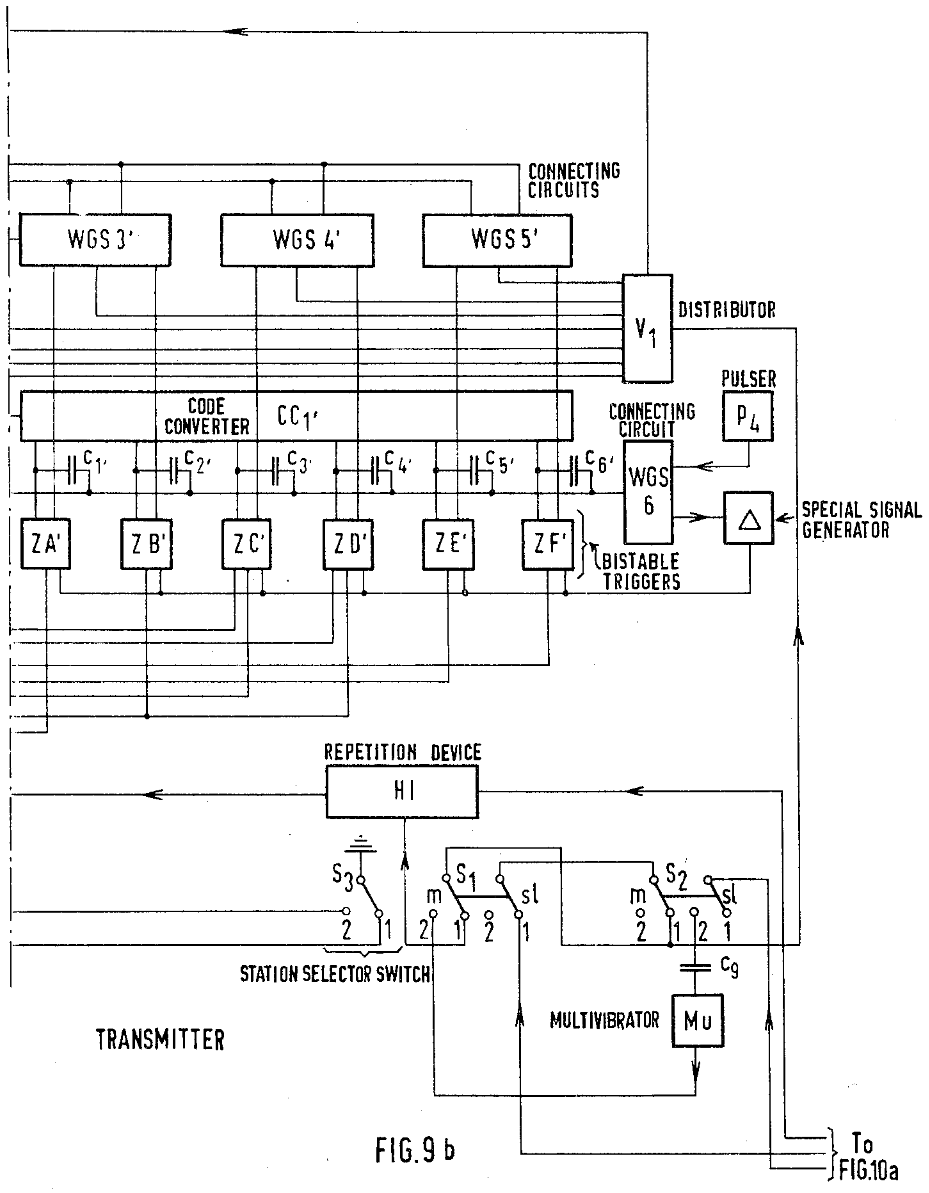
Figure 11:
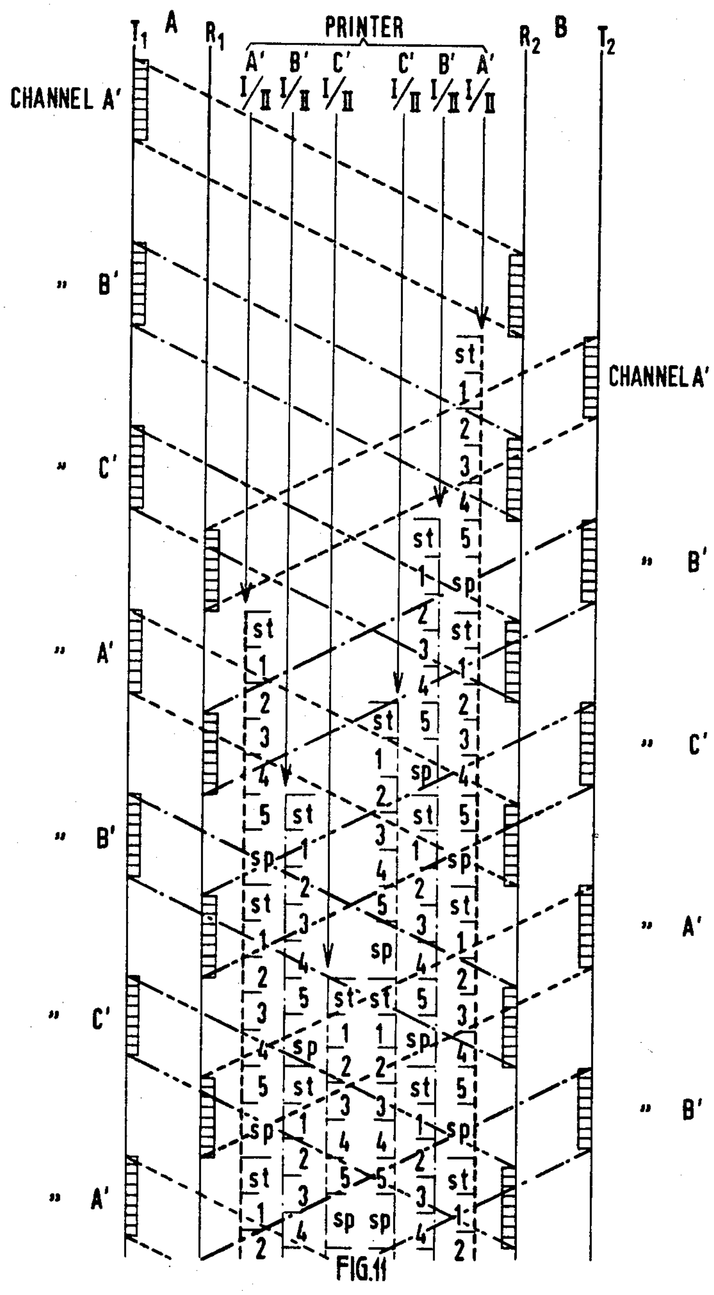
Figure 12:
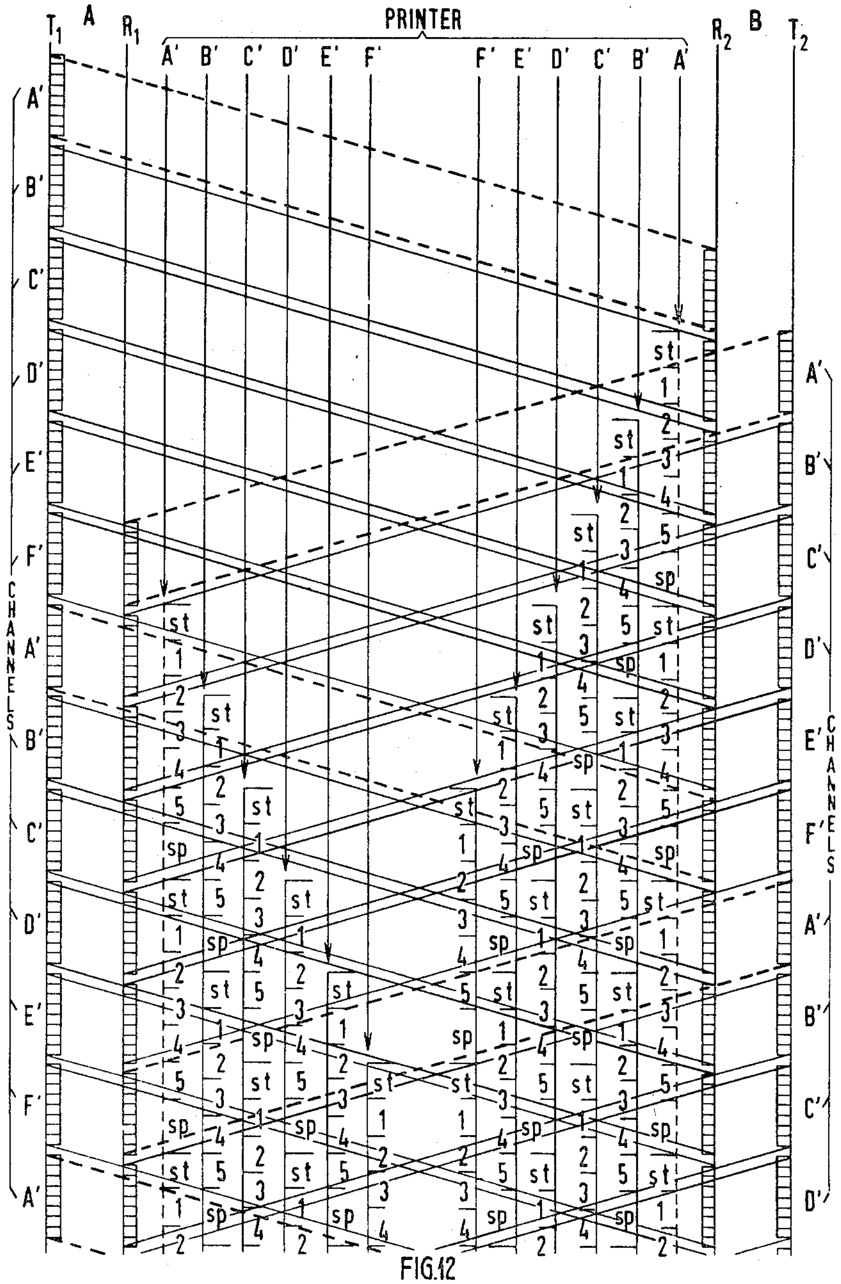
Figures 13, 14:
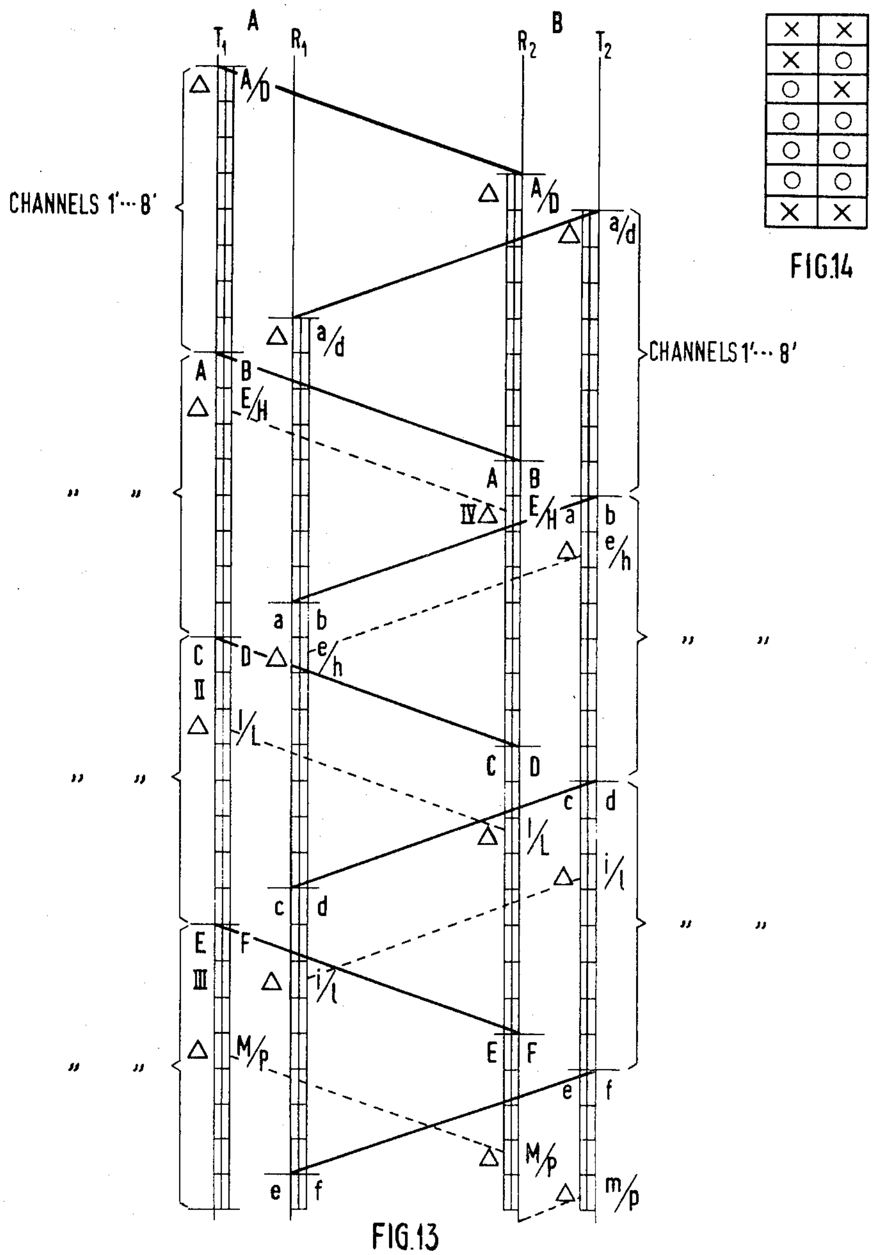
Figure 15:
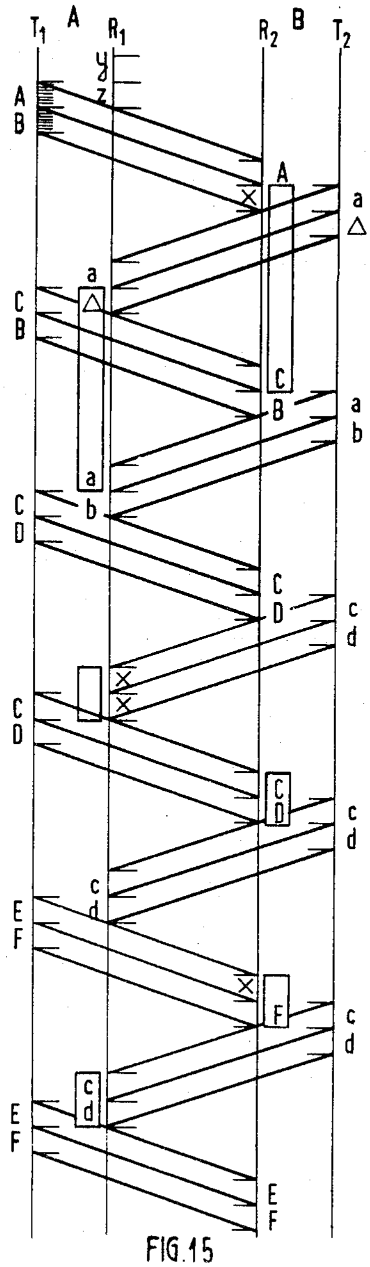
Figure 16:
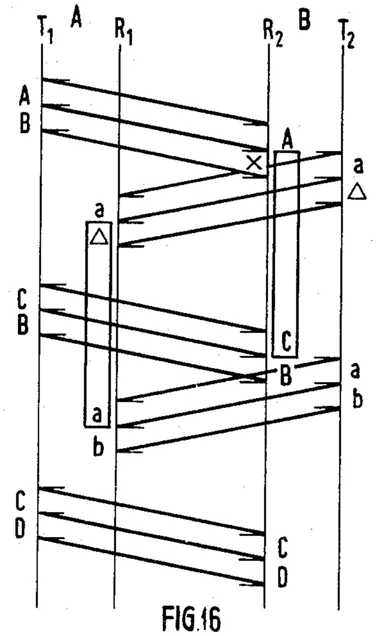
Figures 17, 18:
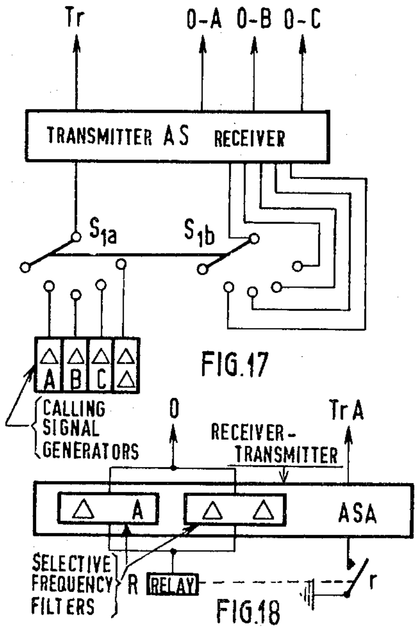

FIGS. 5*a* and 5*b* show a schematic block wiring diagram of an installation according to FIGS. 1–4, FIG. 5*a* being the transmitter lay-out and FIG. 5*b* being the receiver lay-out at the same station;

FIG. 6 is a schematic time diagram of a synchronous communication system with a repetition cycle of one signal group comprising two signals, and with errors or disturbances occurring in the transmission of signals between station A and station B;

FIG. 7 is a schematic time diagram of an asynchronous communication system with a repetition cycle of one signal group comprising two signals and with errors or disturbances occurring in the transmission of signals between the master station and the slave station;

FIG. 8 is a schematic time diagram of a four tone asynchronous communication system adapted to the layouts of FIGS. 9*a*, 9*b*, 10*a* and 10*b*, which transmits pairs of letters both ways composed of the signal elements of FIGS. 6 and 7, with an intermediate or varioplex element between each pair;

FIGS. 9*a*, 9*b*, 10*a* and 10*b* show a schematic block wiring diagram of an installation according to FIGS. 6, 7 and 8; FIGS. 9*a* and 9*b* being the transmitter lay-out, and FIGS. 10 and 10*b* being the receiver lay-out at the same station;

FIG. 11 is a schematic time diagram of a multi or three channel synchronous or asynchronous system with varioplex according to FIG. 8, each letter group in this case comprising eight elements;

FIG. 12 is a schematic time diagram of a six channel synchronous or asynchronous system without varioplex according to FIG. 8 or 11, in which a channel is formed of eight elements comprising two three element signals comprising two three element signals spaced by a fourth element and followed by an eighth element, which fourth and eighth elements in combination are employed for indicating the different channels;

FIG. 13 is a schematic time diagram of a twinplex seven-unit synchronous communication system with eight channels, the subscriber who receives the signals being chosen by the emission of the special service signal Δ followed by the letter corresponding to that subscriber, the dotted lines indicating the path of the syncro-selecting signals;

FIG. 14 is a schematic diagram showing the twinplex element composition of each channel of the signal according to FIG. 13, in which a channel is formed by combining two signals consisting of seven elements of five milliseconds each with corresponding elements of each seven unit signal being transmitted simultaneously;

FIG. 15 is a schematic time diagram of a seven unit synchronous communication system in which two letter characters are transmitted sequentially as a group and the stations proceed to the transmission of the next group right after the repetition of the first signal of each group, that is, the letters in each group are treated singly;

FIG. 16 is a schematic time diagram of a communication system, similar to FIG. 15, in which the excess propagation time available is taken up by a relative shift of the phases;

FIG. 17 shows a schematic block diagram of a transmitter and receiver device in a communication network capable of sending a message either to one preselected sub-station or to all of a number of sub-stations; and FIG. 18 shows a schematic block diagram of a receiver and transmitter at one of the substations cooperating with the transmitter and receiver according to FIG. 17.

The following detailed description of this invention and its interrelated features is divided for clarity and easy reference according to the following outline:

I. Single Symbol Communication System (single step repetition cycle)
  A. Signal Communication
    1. Synchronous System (FIGS. 1 and 2)
  B. Station Circuitry (FIG. 5)
    1. Transmitter (FIG. 5*a*)
    2. Receiver (FIG. 5*b*)
    3. Automatic Repetition Operations
      *a*. In a synchronous system
      *b*. In an asynchronous system
      *c*. Summary of possibilities
II. Double Symbol Communication System (two-step repetition cycle)
  A. Double Signal Communication
    1. Synchronous System (FIG. 6)
    2. Asynchronous System (FIG. 7)
    3. Varioplex System (FIG. 8)
  B. Station Circuitry
    1. Transmitter (FIGS. 9*a* and 9*b*)
    2. Receiver (FIGS. 10*a* and 10*b*)
  C. Multi-Channel Operations
    1. Synchronous or Asynchronous System With
      *a*. Three Channel Varioplex (FIG. 11)
      *b*. Six Channel Without Varioplex (FIG. 12)
    2. Synchronous System
      *a*. Eight Channel Twinplex (FIGS. 13 and 14)
  D. Separate Symbol Repetition (Snychronous) (FIGS. 15, 16)
  E. Network Operation (Synchronous or Asynchronous) (FIGS. 17 and 18)

I. SINGLE SYMBOL COMMUNICATION SYSTEM

A. Signal Communication

1. *Synchronous System*

Figure 1:
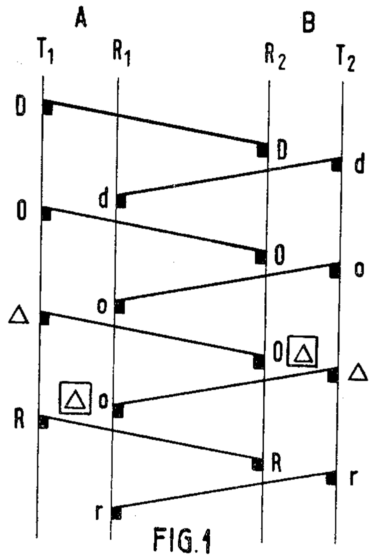
FIG. 1 is a schematic time diagram of a synchronous communication system with a repetition cycle of one signal in which no disturbances or errors occur in the transmission of signals between station A and station B, the use of capital letters at station A and lower case letters at station B indicating the direction and different signal channels of transmission of the signals.
Figure 2:
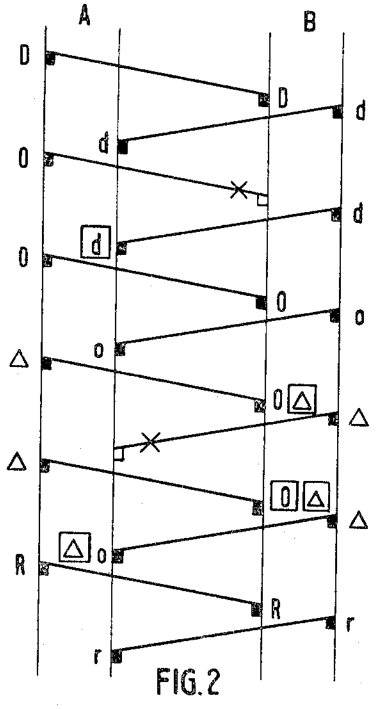
FIG. 2 is a schematic time diagram of a synchronous communication system similar to FIG. 1, with errors or disturbances occurring in the transmission of signals between station A and station B.

In the time diagram of FIGS. 1 and 2 the word "DOOR" is transmitted in a synchronous system from station A to station B, and the word "door" is transmitted from station B to station A, the capital and lower case letters indicating, respectively, the direction of transmission of the two signal channels and not repetition of each other. The time is illustrated vertically and finite transmission velocity is schematically illustrated by the inclined lines between Transmitter T1 at station A and collaborating receiver R2 at station B and between transmitter T2 at station B and receiver R1 at station A. In FIG. 1, it assumed that the first two letters "D" and "O" are correctly received, but according to the invention, the second occurrence of the letter "O" is changed, before transmission, into the service signal Δ, and said signal Δ is transmitted instead and is correctly received at the receiver R2 of station B and here is changed into the lastly transmitted signal, that is, back into an "O," before the symbol is fed to the printer at station B. This change is acknowledged by showing the relevant service symbol Δ enclosed in a rectangle near the line R2. Thus symbols shown in such rectangles are not printed.

Practically analogous operations occur in the transmission of the word "door" from station B to station A. The transmission of the letter "d" is initiated from the transmitter T2 at station B as soon as the correct reception of letter "D" from station A has been registered. At station A, the letter "O" is emitted as soon as correct reception of the letter "d" has been registered on receiver R1 at station A, and so on.

In the time diagram of FIG. 2, mutilations on the radio path of the synchronous system of FIG. 1 are shown, which mutilations occur in the transmission of the first "O" from station A; and in the service signal "Δ" instead of the second letter "o" from station B. The reason for changing the text repetition symbols into service signals is relevant to the invention, since it has for a consequence that the receivers can also be constructed not to accept repetition symbols as part of a normal text transmission. Actually this has been done, as will become apparent in the description of the wiring diagrams of the transmitter and receiver as shown in FIG. 5 described later, and use has been made of this fact to have a receiver accept a repeated symbol, as if it should be received as a request for repetition.

For example, FIG. 2 shows that on the reception of the first error by receiver R2 at station B, transmitter T2 at station B, due to an internal connection between receiver R2 and transmitter T2 (shown in FIG. 5), replaces the letter "o," it was about to transmit, by a repetition of the previously emitted letter "d." This letter "d" is detected at the receiver R1 at station A as being identical with the last received signal, and thus is suppressed and not printed as shown by the enclosing rectangle, but not before it had caused the repetition device at station A to start working to repeat the transmission of letter "O" by transmitter T1. This time "O" is supposed to arrive correctly; and then fed to the printer at station B. The next letter now to be transmitted by transmitter T1 is identical to the first transmitted mutilated letter "O," but, due to the action of the repetition device of this invention the second "O" in the word "DOOR" is, however, converted into the service signal Δ, and reconverted to an "O" on reception at station B. It is herein illustrated in FIG. 2 to be emitted twice, due to the reception from station B of an error for the first signal Δ, as indicated by a cross and a blank small rectangle near line R1, and must be repeated as described above for the mutilated letter "O." Thus, as a moment before, a service signal "Δ" from station B was received at station A, the present arrival of a second service signal "Δ" indicates a request for repetition, and station B repeats its transmission of its last received signal, which also was a service signal "Δ," and suppresses the printing of a third letter "O" as indicated in a rectangle. Since this service signal "Δ" is now correctly received at station A, it is converted into the last correctly received letter, namely "o," and the next letter "R" is now permitted to be transmitted to station B, so that the transmission continues normally as shown in FIG. 1.

I–A–2. *Asynchronous System*

FIGS. 3 and 4 show the operation of asynchronous systems, which have a master station M and a slave station S. Whereas the synchronous system had continuously running distributors at all four vertical lines of FIGS. 1 and 2, in the asynchronous system only the master station has them, and the distributors in the slave station, at receiver R2 and transmitter T2, are started at every receipt of a correct symbol from station A, permitting transmission from the transmitter T2 only after such correct reception. Thus, FIGS. 1 and 3 are identical, but in case of a mutilation as shown in FIGS. 4, where an "o" should be been emitted in the first place from slave station S, no symbol at all is emitted, because on receiver R2 of FIG. 4 no symbol had been correctly received, as shown by a cross and a blank small rectangle on line R2. Thus no letter is printed at the slave station S and no next signal is transmitted by said station. The master station M, not receiving a symbol in a sufficient lapse of time after the "d" which it had correctly received from slave station S, is thus notified of a request for repetition and accordingly repeats its "O"; the manner in which this is accomplished will become apparent later from the description of FIGS. 5. This repetition of "O" being correctly received on receiver R2 of the slave station S will cause its transmitter T2 to emit an "o," actually the first "o." The second "O" from the master station's transmitter T1 is changed into a service signal Δ, herein assumed to be received correctly. This correct reception at the slave station S permits the transmission from its transmitter T2, the second "o" modified, however, according to the general rule, into a service signal Δ; which service signal Δ, however, is shown herein to have been mutilated in transmission, resulting in the repetition of the previous service signal Δ transmitted by the master station's transmitter T1. This second "O," resulting from the reconversion of the second service signal, is suppressed, due to the action of the repetition device at the slave station S, but not before having occasioned the repeated emission of the service signal Δ from the transmitter T2 of slave station S which was then received correctly and reconverted in the master station M into the second "o" of the word "door." The further text is shown herein to have been transmitted without further mishap.

It may be noted that the diagrams of FIGS. 1–4 have been drawn up for maximum available and utilized propagation time. If the utilized propagation time would have been less than the optimum available time, which could have been the case if the distance between the stations had been less, this would have been apparent by a small pause between arrival of a letter and the next following emitted letter, such as for instance in the right-hand portion of the diagram of FIG. 16 described later.

I–B. STATION CIRCUITRY

1. *Transmitter*

FIG. 5 is a block schematic diagram of an embodiment of the present invention functioning according to the time diagrams shown in FIGS. 1–4, each of the stations A or M and B or S having a transmitter and receiver as shown in FIGS. 5*a* and 5*b*, respectively.

The transmitter in FIG. 5*a* comprises a tape transmitter or keyer S*t*, stepping under impulses from an impulser *p*3, at each step a strip or tape having five-unit code signals successively punched therein is advanced, thereby presenting the next five-unit or element code signal for scanning. The five outputs from the keyer are each connected to separate bistable multivibrator type of trigger storing circuits ZA, ZB, ZC, ZE and ZF, by way of a connecting or gating circuit of rectifier-resistance cell combinations arranged in the block WGS1. The moment in which the five elements from the keyer are transferred to the trigger circuit inputs, may be determined by an impulser *p*1.

A sixth element is formed in a trigger circuit ZD; this element being derived from the second element in trigger ZB. The general rule applies that if the second element in the five unit code is a mark, the fourth element in the six-unit code must be a space, and conversely. In this manner 24 of the 32 code signals are transformed directly from the five-unit code into the six-unit code; the remaining 8 signals having to be converted into the six-unit code in another manner. This conversion also should be effected according to another rule, namely, that the combination of signal elements 3—4 must not be equal to either the combination of elements 1—2 or 5—6, which is required because of the way in which on reception the signal is tested for correctness, that is, by counting the number of changes in frequency in the above described multi-frequency shift communication system, in which adjacent pair of elements that is, elements 1—2, 3—4, and 5—6 of the code signal transmitted have different frequencies. In these systems, a standard five-unit or element telegraph code is converted into a six-element code and then into a three-element code in which the first and second, third and fourth, and fifth and sixth elements of the six-element code are paired together to be converted into any one of four different frequencies, thereby permitting 4×3×3=36 different combinations for the 32 different telegraph code signals of the original standard five unit telegraph code, plus 4 signals for sepcial, selecting and/or synchronizing purposes as will be described later.

The first conversion into the six-unit code immediately determines 24 out of the 32 total code signals and also satisfies said second rule, but there still remain 8 code signals to be transferred to the six-unit code by a different method. The conversion of these 8 signals may be accomplished by a code converter CC1, the inputs of which are connected to the outputs from triggers ZA, ZB, ZC, ZE and ZF, and which code converter CC1 contains rectifier-resistance combinations. The converter output is connected via rectifier-resistance combination connecting circuit WGS2 to the inputs of triggers ZC and ZD and is controlled by the impulser *p*2. The outputs from trigger circuits ZA through ZF are connected by pairs to other monostable output trigger circuits ZG and ZH, via rectifier-resistance combinations or connecting circuits WGS3, WGS4 and WGS5, which is done under the control of a distributor V1. The combinations of the first and second units, third and fourth units, and the fifth and sixth units are in this way successively transferred to the output triggers ZG and ZH.

Every combination of elements initiates one of four voltages on the output from triggers ZG and ZH, with each succeeding element being given another value than the previous one. These voltages are led to a multi-frequency multi-vibrator Z1, generating therefor a different frequency for every element combination; in all there will be four different frequencies at the output. In this manner, the signal is converted in this second conversion into a three-unit signal. The radio or other type of transmitter RZ is modulated by the frequency at the output from the multivibrator ZI.

Signals are emitted by multivibrator ZI whenever the distributor V1 is started, which is done either by the multivibrator M*u* when switch S1 is in position 2, in a synchronous system according to FIGS. 1 and 2, or by the repetition device HI in the transmitter (or blocking device BI in the receiver FIG. 5*b* at this station) when switch S1 is in position 1, that is in an asynchronous system according to FIGS. 3 and 4 when the station is a slave station for receiving letter signals, as will be explained in detail below.

As long as as there are no messages being transmitted, the station will emit "idle time" signals, however, in the case of a slave station, it will only emit "idle time" signals when it is receiving correct letter signals. The emission of idle time signals is insured by an idle time device I*t* (FIG. 5*a*) which, during such an idle interval, acts in place of the keyer S*t*.

I–B–2. *Receiver*

The signals from the station A or master station M are received as four-frequency signals on radio or other type of receiver RO (see FIG. 5a), connected to four filters F1, F2, F3 and F4, each selective to one of these four frequencies. The filter outputs lead to the inputs of bistable or storing triggers OA, OB, OC and OD, and the outputs from these triggers lead by way of condensers c8, c9, c10 and c11 to an impulser p5 of a counting chain device containing monostable triggers OK, OL and OM. Each of triggers OA through OD also is connected at its output to the rectifier-resistance combination or connecting circuit WGS7. The output from said combination WGS7 is connected via a number of rectifier-resistance or other connecting circuits WGS8, WGS9 and WGS10 to the inputs of six bistable or storing triggers OE through OJ.

The counting device of circuits p5, OK, OL and OM functions in such a manner that the first element of an arriving signal actuates trigger OK, the second element actuates trigger OL, and the third element actuates trigger OM. The first element is placed by the trigger OK on trigger combinations OE and OF, the second element on trigger combinations OG and OH by the trigger OL, and the third element on trigger combination OI and OJ by trigger OM. The entire signal is now lying on or stored in the bistable triggers OE through OJ, again in the six unit code. Of the 32 symbols of a code, there are 28 symbols which may be transformed back to the original five unit symbol by the simple omission of the fourth element. In the four remaining cases, the third element of the received six unit symbol has to be first reconverted, which is accomplished by means of the code converter CC2. Thus, the code converter CC2 is connected to the outputs of triggers OF and OH, and moreover to the outputs of triggers OA through OD, and lastly to an input of trigger OG, to which the converted third element of the six unit code is applied. The input of trigger OG is also connected to a retarded output from trigger OM, so that it cannot trigger on an arbitrary impulse from the code converter CC2.

The outputs of triggers OE, OF, OG, OH, OK and OJ are connected to a rectifier-resistance combination or comparison circuit WGS11, the outputs of which are again connected to inputs of six additional triggers OO through OT. The outputs of these last mentioned additional bistable triggers are again led back to rectifier-resistance combination WGS11, together with the output from a pulser p6. Other outputs from the five triggers OO, OP, OQ, OS and OT lead to condensers c12 through c16 respectively, and then to another rectifier-resistance combination or connecting circuit WGS12, which is timed by the distributor V2. The complete symbol is formed here, preceded by a start and followed by a stop element; which symbol is then led to a printer PR.

Distributor V2 is under the control of the blocking device or blocker BI, which normally is in blocking condition and only changes temporarily to its de-blocked state on the reception of a pulse from the combination circuit WGS11. In the blocking condition, distributor V2 is stopped and the signal cannot reach the printer PR from the circuit WGS11. The pulser p6 is controlled through conductor 11 from the last counting trigger OM to emit a pulse, which means that a signal has been correctly received, and the counting chain (circuits p5, OK, OL, OM) has counted up to three, signifying that all three elements of the multi-frequency modulated three element signal have arrived. This impulse from the pulser p6 permits the rectifier-resistance combination WGS11 to exert its control on blocker BI dependent on the relative conditions of triggers OE through OJ and OO through OT.

*I–B–3. Automatic repetition operations*

In order to request repetition of a mutilated signal, the last signal transmitted is repeated or retransmitted. When this duplication occurs at a receiver, its blocker B1 will not receive a deblocking control pulse from pulser p6 through the connecting circuit WGS 11, because the triggers OE through OJ are in the same position as triggers OO through OT. Then, the blocking device BI through conductor 12 will indicate to the repetition device HI is the transmitter (see FIG. 5a) at the receiver's station will remain in its repeating position, and when its distributor V1 receives another start impulse, it will repeat its last transmitted signal again, while the distributor V2 of the receiver will stay blocked. If during said impulse from the pulser p6 in the receiver, triggers OE through OJ should be in the combination denoting a service signal Δ, indicating that the last received signal must be repeated for the message, the blocker BI will receive a deblocking pulse and the previous signal still lying in trigger OO through OT is printed again. Should triggers OE through OJ, during the impulse from the pulser p6 not be in the special service signal Δ position, nor in the same position as triggers OO through OT, then a correct signal, letter or symbol has been received and the position of the latter triggers will be changed to that of triggers OE through OJ, and the blocker BI receives the deblocking pulse, whereby the position just acquired by triggers OO through OT can be printed by transfer to the printer PR.

The repetition device HI of each transmitter (see FIG. 5a) is always under the control of the blocking device BI in its associated receiver through conductor 12 (see FIGS. 5a and 5b). When a code symbol has been received mutilated in the receiver, or as a repetition of a symbol already received (either of which amounts to a request for repetition), the blocking device BI will go into the blocking position and transmit no control impulse to the repetition device HI in its associated transmitter at that station, which, among other actions, prevents the pulsers p1 and p3 in the transmitter from giving off impulses. Thereby the keyer St cannot step forwards, and pulser p2 also is blocked so that code converter CC1 is also stopped. Thus, the last transmitted signal still remaining in the trigger circuits ZA through ZF connected to the circuits WGS3, WGS4 and WGS5 is again transmitted when a pulse therefor is received in the distributor V1.

On the arrival of an un-mutilated or correct code symbol differing from the preceding one, the blocking device BI goes into the free position so that the repetition device HI will permit the pulser p1 to control the rectifier-resistance combination WGS1, thereby permitting the next signal to be given off from the keyer St to be connected and transmitted. Each succeeding letter from the keyer St will bring the triggers ZA through ZF into a position different from the one last occupied, if the new letter differs from the preceding one.

The outputs from triggers ZA through ZF in the transmitter of FIG. 5a are connected via condensers c1 through c6 to one input of the rectifier-resistance combination on connecting circuit WGS6, and to a second input of the circuit WGS6 there is connected a pulser p4. The output of circuit WGS6 is connected to the special signal generator or pulser Δ, which normally is in active position, meaning that pulser Δ would bring triggers ZA through ZF into a position corresponding to the special signal or symbol Δ, if it were permitted to be operated only by the pulser p4. However, when the special signal pulser Δ receives a pulse both from the pulser p4 and the condensers c1 through c6 (due to the potential change in the circuit WGS6), the pulser Δ becomes inactive so that it cannot influence the triggers ZA through ZF, to which its output is connected, and then the letter last offered by the keyer St is again converted, modulated and transmitted from transmitter RZ. Only when the keyer St should have offered the same letter twice in succession, does not potential jump across condensers c1 through c6, and the special symbol Δ is recorded for transmission by the pulse from the pulser p4, instead of a repetition of the last letter offered, to indicate that the last letter occurs twice in sequence in the correct message being communicated.

I—B–3–a. IN A SYNCHRONOUS SYSTEM

In a synchronous operation of the circuits of FIGS. 5, the multivibrators M*u* at both stations A and B are kept in step and both transmitters are continuously transmitting. In this case the switch S1 is always in its position 2 (*m*) at both stations, so that the pulses from the multivibrators M*u* will directly control the operation of the distributors V1.

In the station initiating the signal, its switch S2 is in its position 1 (*m*), and this station transmits signals independent of any reception. However, for the station receiving said signal, in order to continue to be in synchronism with the initiating station, its transmitter switch S2 should be placed in its position 2 (*s*1), so that its multivibrator M*u* can be synchronized by the arriving signal elements of said signal as indicated by the connection 13 between the trigger OM of its receiver's counting device and the multivibrator M*u* through condenser *c*7. Thus, in this synchronous system operation, the initiating station may be called an "etherial master" station, and the station that receives its signals an "etherial slave" station, as distinguished from the "letter master" and "letter slave" stations described below in asynchronous system.

I—B–3–b. IN AN ASYCHRONOUS SYSTEM

In asynchronous operation, one station M is continuously transmitting ("letter master"), and the other station S is synchronized in its signal emissions ("letter slave") by the reception of correct letters from the master station M. Thus, in the master station, both of its switches S1 and S2 are in their master or positions 2 (*m*), while in its slave station or stations, both its switches S1 and S2 are in their slave or positions 1 (*s*1).

The master station M operates according to that of the initiating station ("etherial master") described above in a synchronous system.

However, the slave station S operates under the direct control of only the correct signals or symbols received from the master. Accordingly, the distributor V1 in the transmitter at the slave station S, which controls the signal emission therefrom, is only started when the switches S1 and S2 are in their slave positions 1 (*s*1) as shown in FIG. 5*a*, and when control from rectifier-resistance comparison circuit WGS11 in the receiver of that station gives through conductors 14, 15 and 16 the proper signal (meaning, receiving at this slave station the same symbol or signal twice), to activate through the direct connections 14 and 15 shown in FIGS. 5, the distributor V1, while the repetition device HI remains blocked so that the last letter emitted is repeated. FIGS. 3 and 4 apply to this operation, and the transmitter can emit a new symbol only after reception of a correct signal or symbol and the repetition device HI is deblocked as has been previously described.

Thus, both stations remain in their "slave" positions as long as there are no signals to be transmitted either way. If a station wants to start transmission, it brings its switch S1 into its master position 2 (*m*), and a signal is emitted, whether or not any signals are received. As soon as the receiver at the remote station gets acknowledgement of correct reception of this first signal, the initiating or master station transmitter proceeds to the next signal. When traffic ceases from a transmitter, which has gone into "letter master" position by bringing the switch S1 into its master position 2, transmission might be closed by this station, by bringing its switch S1 back to its position 1, but means may be provided for delaying this until traffic from its other station has also ceased, when its switches S1 and S2 are in "letter slave" position 1. As long as there is no traffic in both stations, the switches S1 are in "slave" positions 1 as shown, and there is no modulation of their transmitters.

I–B–3–c. SUMMARY OF POSSIBILITIES

The above synchronous and asynchronous operations can be summarized by the following table of possibilities or cases:

With—

(I) switch S2 in position 1, switch S1 in position 2 — we have (*a*) the synchronous ("etherial" master) case; (*b*) the asynchronous ("letter" master) case (II) switch S2 in position 1, switch S1 in position 1 — we have the asynchronous ("letter" slave) case (III) switch S2 in position 2, switch S1 in position 2 — we have the synchronous ("etherial" slave) case (IV) switch S2 in position 2, switch S1 in position 1 — we have an impossible combination Whichever of the two possibilities specified under Case I above will apply, will depend, by convention with the other or remote station, on that station position, whether Case III (to go with I*a*) or Case II (to go with I*b*).

The designations "etherial" master and "etherial" slave relate to the synchronization of the multivibrators M*u* in both stations; one of them (say in station A) being independent (switch S2 in position 1, Case I*a*) and the other one (station B) being dependent (Case III).

II. DOUBLE SYMBOL COMMUNICATION SYSTEM

The description of the prior FIGS. 1 through 6 all relate to a system operating with a repetition device of a single step or repetition cycle. The propagation time which can be mastered with such a system is in the order of 55 milliseconds. In order to deal with larger times, say up to 108 milliseconds, the systems shown schematically in FIGS. 6 through 12, of time and circuit diagrams have been designed and now will be discussed. These systems are referred to as double symbol communication systems in which two letter signals are successively sent before the repetition cycle is sent, and thus produce a two step repetition cycle. The transmission of these double symbols may take place sequentially or simultaneously by a twinplex process. The interval between two signals transmitted sequentially as a pair or in a group may be equal to the duration of one element of such signals and then it can be utilized for transmitting additional information. The frequency of this intermediate element, however, must be different from the last element of the first signal and the first element of the second signal in the group.

II–A. Double Signal Communication

The operation of the system according to FIGS. 9*a* and 9*b* and 10*a* and 10*b* may be followed with reference to the schematic time diagrams of FIGS. 6 and 7, analogous to FIGS. 1–4 applied to FIGS. 5*a* and 5*b*.

In both FIGS. 6 and 7 for purposes of illustration, it is assumed that the word "DEDEMSVAART." is transmitted from station A to station B, and the word "dedemsvaart." being at practically the same time transmitted from station B to station A, and in all stations the letters are transmitted in successive pairs or pairwise.

II–A–1. *Synchronous system*

Letter pair transmission in a synchronous double symbol system is schematically illustrated in FIG. 6. Since the second signal to be transmitted is the same as the first, the second "DE" from station A (or in the second transmission "de" from station B) must be reformed to a signal DΔ (or dΔ respectively) so that station B (or station A) will not interpret this second "DE" (or "de") as a request to repeat the previously transmitted signal.

Thus only one, herein the second of the two signals, need to be changed into a special service signal Δ, and when the reformed signal DΔ (or dΔ) is correctly received at the station B (or A), it is then converted back to second DE (or de), identical to the signal last received. The second MS at station A, FIG. 6, is emitted because of the repeated reception on receiver R1 of dΔ indicating a request for its repetition, and the third MS transmitted from transmitter T1 of station A is due to the mutilated reception of the first "ms" from the transmitter T2 of station B. The second reception of a signal like DΔ is suppressed, however, but not before having given rise to the re-printing of the previous pair (DE in this case). The second reception of a signal pair like MS is always suppressed, however, but not before having given rise to the repetition of the pair last emitted from that station (second emission of "ms" from the transmitter T2 of station B).

II–A–2. *Asynchronous system*

For transmission of the same word "dedemsvaart." in both directions in an asynchronous system with the same disturbances as occurred in FIG. 6, reference is made to FIG. 7 of a master-slave "letter" synchronization system, wherein a letter pair is only transmitted from the slave station S transmitter T2 insofar as the associated receiver R2 has received the correct letters. Therefore nothing is transmitted between the transmission of the second "de" (transmitted as "dΔ") and the first "ms," because the first "MS" from station A has been mutilated. Thus the master station asks for repetition by repeating its last transmitted signal, and the slave station asks for repetition by sending nothing during the time that it should.

II–A–3. *Varioplex system*

In FIG. 8 is asynchronous or an expanded time diagram of an asynchronous system, such as that illustrated in FIGS. 6 or 7, for the undisturbed transmission of successive pairs of letter signals spaced by a slight time interval in which an additional element may be inserted, such as a "varioplex" element "*vp*," which not only separates the groups three elements of each letter signal, but may be used also for the selection of one of a pair of subscribers to which the single signal channel is to be directed, so that one channel is at the disposal of two subscribers.

Since the multi-frequency modulated code system, described above in section I–B–1 and in the previously mentioned copending applications, comprises three successive elements for each code letter signal, and each of these elements must possess a different frequency, it is possible that these elements have a comparatively short duration, say of approximately five milliseconds each. Also, since it takes a considerably longer period of time than this to print the five elements of the telegraph code letter to be recorded from this signal, and particularly when this telegraph code letter is combined with a "stop" and "start" element at opposite ends of each of its five intelligence elements, it is thereby possible to transmit a pair of such three element signals of approximately five milliseconds duration, each spaced by an additional varioplex element "*vp*," over a considerable distance and receive back a reply therefore, all during the time which it takes the keyer and/or printer at the two remote stations to convert letters of the message from and to their corresponding five (or seven) element telegraph code signal.

Referring now more specifically to FIG. 8, there is diagrammatically shown downwardly in the first two columns from left to right, the disturbances of the first and second memory times for the triggers of the circuits shown in the transmitter of FIGS. 9*a* and 9*b*, one column for each letter, "A" and "B," of the pair. These memory circuits correspond to the trigger circuits ZA through ZF in FIG. 9*a* for the first column, and to triggers ZA′ through ZF′ in FIG. 9*b* for the second column as will be described later. The third or next column discloses the operation of the keyer (St′) which, although it steps only one letter of the code or row of holes in a tape at a time, is herein adapted to read two letters or rows of holes, so that after it is in position to read the first two letters A and B (which have been sent according to the diagram in FIG. 8), it is then stepped one step or row at a time to place the letters "BC" in the keyer and then to the next space "CD" for the next different pair by the time the signal has returned from the other station. The correct reception of a signal from the other station indicates that the new pair of letters CD may be transferred to the first and second memory circuits as indicated in the first and second columns, and the former pair of letters AB may be removed therefrom. However, if an error does occur and a repetition of the first letters AB are required, there is shown sufficient time beyond the second stepping of the keyer for the re-transmission of the first two letters AB and for the stopping of the keyer (not shown in FIG. 8) until a correct reception has been received.

The next two vertical columns represent the transmitter T1 and receiver R1 at the first or initiating station A, along the former of which there are shown the seven multi-frequency elements of the double signal transmitted, the first three of which correspond to the letter A, the last three of which correspond to the letter B, and the center one of which corresponds to the varioplex signal *vp*. Similarly, the pair of letters ab separated by another varioplex signal *vp* is received at receiver R1 from the station B represented by corresponding columns on the right half of the diagram of FIG. 8.

The central two columns PR I/II represent the five element telegraph code signal printed by the printers at each of the stations A and B, respectively, and the corresponding time taken up therein, which may correspond to, say, 150 milliseconds, as compared with the approximately five seconds duration of each of the multi-frequency signal elements transmitted by the transmitters T1 and T2. The first signal to be received at the station B which is recorded in the right of the two central columns PR I/II indicates that the telegraph code signals for the letters A and B are each successively composed of a start element *st*, five intelligence elements 1, 2, 3, 4 and 5, and a stop element *sp*.

Similarly, at the station B, the receiver R2 and transmitter T2 are represented by vertical lines with the double letter signals *a-b*, *c-d*, etc., being transmitted from transmitter T2 of station B to the receiver R1 of station A. The keyer at station B correspondingly steps one signal at a time but may read two letters signals after two steps, corresponding to the keyer previously described at station A. Station B also contains two memory circuits for each of the letters of the pair *ab* corresponding to the memory circuits for the pairs of letters in station A.

As previously mentioned in the description in section I–B–1 of how the three element multi-frequency code was produced according to the present system of this invention, it should be noted that with the varioplex signal *vp* between the third and fifth elements of the double signal shown in FIG. 8, there is a possibility of at most three other different frequencies for the fourth varioplex element to distinguish from the third and fifth elements if they are at the same frequency, or at least two other frequencies which the varioplex element *vp* may take. The fact that there are these two certain possibilities is what permits one of a pair of subscribers to be selected by the signals of this channel, which may be arranged so the higher of the two frequencies on the varioplex element *vp* may correspond to one subscriber I, and the lower of the two frequencies may correspond to the other subscriber II. For example, supposing the last element of the first signal of the pair is transmitted by means of frequency 4, and the first element of the second signal of the same pair is transmitted by the frequency 3. Then for the intermediate or varioplex element there remains available either frequency 2 or frequency 1. Thus, the lower of these two frequencies is frequency 1 which is chosen to indicate that this signal group is intended for subscriber I, and the higher of the two is chosen to indicate that the relevant group is intended for subscriber II. Suppose further that in the next double signal, the frequencies of the last element of the first signal and the first element of the second signal are the frequencies 3 and 2, respectively, then there remains for the intermediate or varioplex element the frequencies 1 and 4. If frequency 1 (the lower one) is sent, this means that the group is destined for subscriber I, whereas if frequency 4 (the higher one) is sent, the group is destined for subscriber II. There is also a possibility that the last element of the first signal and the first element of the second are identical, in which case there is a choice of one out of three frequencies for the varioplex element. This time also the choice is made in such a way that the lower frequency indicates the destination for subscriber I and the higher frequency indicating the destination for subscriber II. It results from the above that in the transmission of the intermediate element or varioplex destinative element, use is made of the same frequencies as for the transmission of the code signal elements. Thus, the varioplex element *vp* determines which one of the printers PR I or PR II is to respond to the signal being transmitted according to the system shown in FIG. 8, and described in detail below in connection with the schematic wiring diagrams of FIGS. 9 and 10.

II–B. Station Circuitry

1. *Transmitter*

FIGS. 9*a* and 9*b* and 10*a* and 10*b* show block schematic wiring diagrams of a transmitter and receiver circuits at a single station corresponding to the circuits of FIG. 5, but providing circuits for over twice as many signal elements so as to permit a larger available propagation time for signals with respect to that for repetition and correction purposes.

Referring more specifically to the transmitter shown in FIG. 9, the pulser *p*1 for the keyer *St'* in the receiver of FIG. 9*a* must now be complemented by an additional pulse *p*1' to read the pair of telegraph signals as they are stepped in position in the keyer *St'*. These pulsers *p*1 and *p*1' are connected so that they alternately furnish pulses for successively setting up the circuits through combination or connecting circuits WGS1 from the keyed letters by pulser *p*1 onto the bistable storing triggers ZA through ZF shown in FIG. 9*a*, and by the pulser *p*1' onto the bistable storing triggers ZA' through ZF' shown in FIG. 9*b*.

Figure 10A:
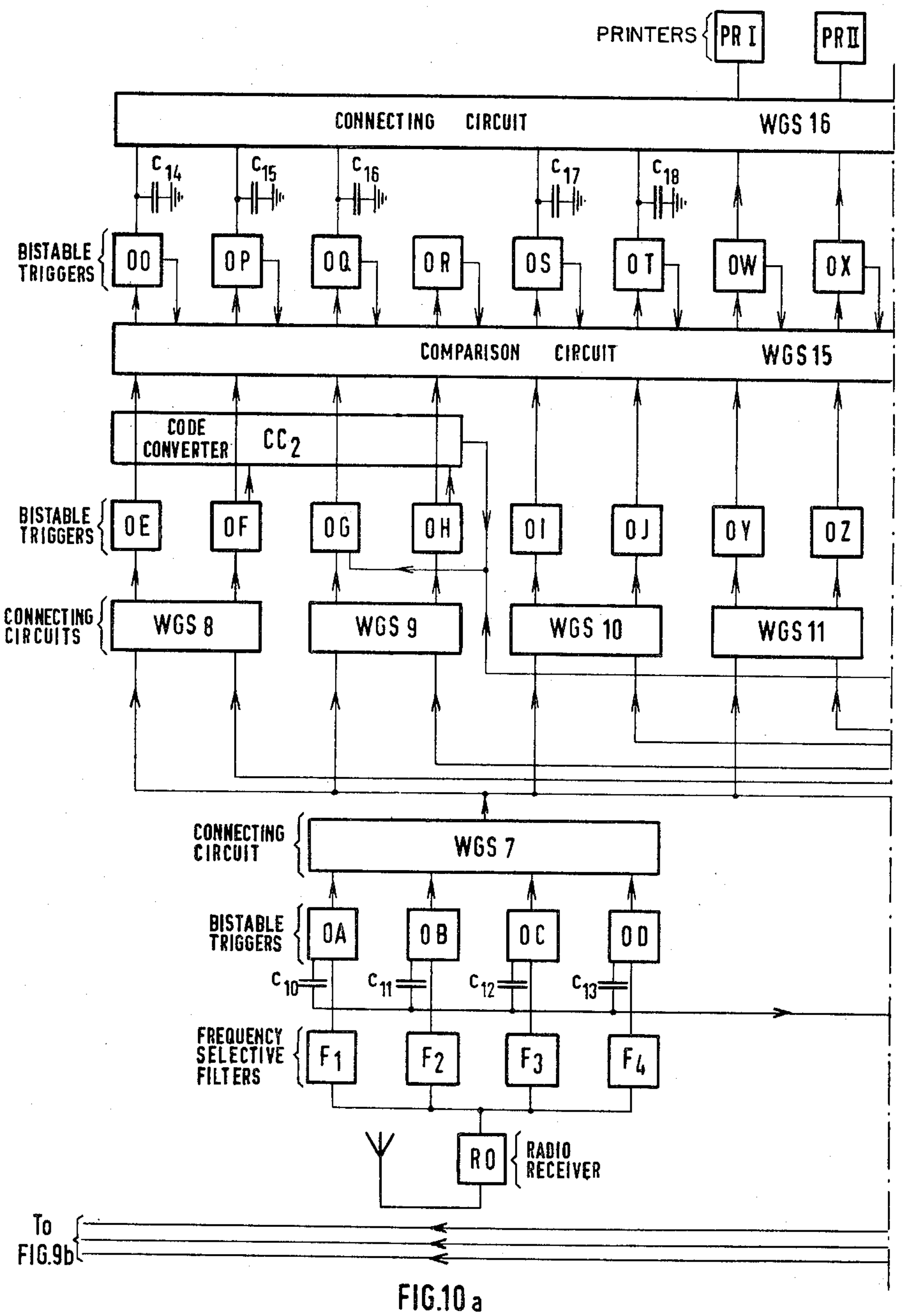

In a system wherein an initiating station wishes to select one of two different subscribers at a given receiving station, an additional signal element may be employed in each signal therefor, such as the varioplex signal mentioned in Section II–A–3 above, and then two additional or centrally arranged bistable or storing triggers ZY and ZZ shown in FIG. 9*a* may be employed which may occupy one of two positions corresponding to one of the two different subscribers I and II with whom a connection is desired and to which a corresponding one of the two printers PRI and PRII shown in FIG. 10*a* of the remote receiver is connected. This selection, however, may be accomplished by the adjustment of a station selection switch S3 shown in FIG. 9*b* at the signal initiating the transmission station, so that the selection of the proper subscriber is made automatically. The two code converter circuits CC1 and CC1', together with the code converter resistance-rectifier connecting WGS ZF/ZA', insure the correct position for these two additional triggers ZY and ZZ.

The distributor V1' may now control the seven rectifier-resistance combinations or connecting circuits WGS3, WGS4, WGS5, WGS5/3', WGS3', WGS4', and WGS5' whose outputs lead to the two monostables output triggers ZG and ZH, similar to those shown and described in FIG. 5*a*.

In the particular circuit disclosed and in accordance with FIGS. 6 and 7, only the second of the two pair of signals need be converted into the special signal Δ to indicate that the last previously received signal is to be reprinted. However, all of the condensers *c*1 through *c*8 and *c*1' through *c*6' are connected to the combination rectifier-resistance or connecting circuit WGS6 controlling the special signal generator or trigger Δ to indicate when a duplicate pair is to be transmitted. If desired, without departing from the scope of this invention, the special signal trigger Δ may be provided for changing the signal of the first of the pair of letter signals to be transmitted, instead of the second of the pair, or a second special trigger may be provided for changing both. These combinations will be described later in Section II–C–2*a* and II–E below.

The other portions of the circuits of FIGS. 9 and 10, including the master and slave or initiating and responding switches S1 and S2 in FIG. 9*a* for adapting the circuit for either synchronous or asynchronous operation, may control the combinations of the circuits at any one station similar to those circuits of FIG. 5 and described above in Sections I–B–1 and 2.

II–B–2. *Receiver*

Figure 10B:
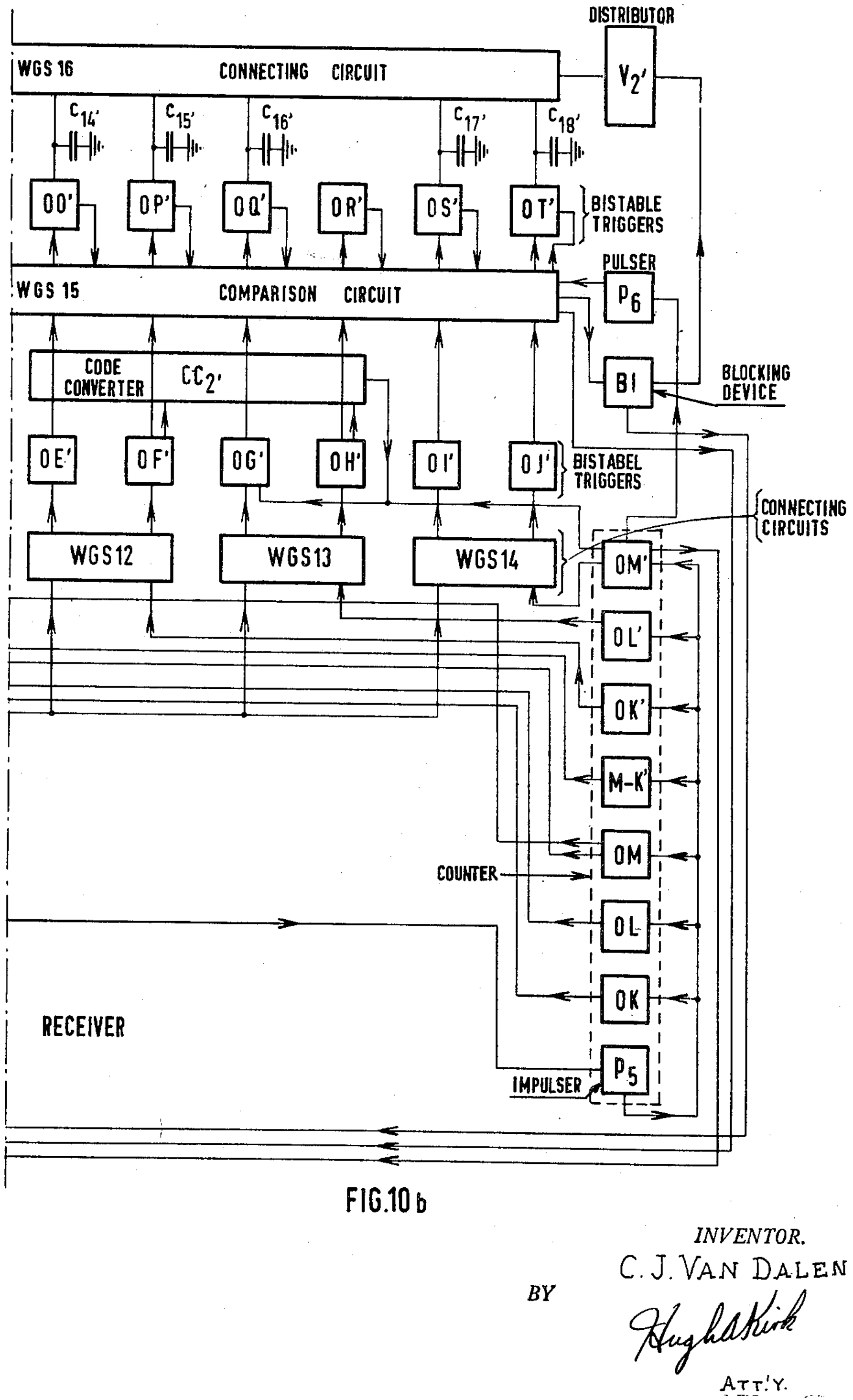

Referring now to the receiver circuit shown in FIGS. 10*a* and 10*b*, the four different frequencies employed in the seven elements of the double letter signal shown in FIG. 8, are received successively similarly to the three elements received at the receiver in FIG. 5*b* through the same four different filter circuits F1 through F4. However, in order to detect all seven elements, the counting chain circuit of monostable triggers OK, OL and OM is supplemented by the additional group of counting chain monostable triggers OK', OL' and OM', together with an intermediate monostable trigger circuit M/K' for registering the intermediate or varioplex element *vp*.

Similar to the fourteen memory triggers ZA through ZF' in the transmitter (see FIG. 9), there are provided fourteen triggers OE through OJ, OE' through OJ', including also triggers OY and OZ for the two positions of the varioplex element *vp*, which fourteen triggers store the elements of the double letter signals as they are received corresponding to the way described above in FIG. 5*b*.

The intermediate or varioplex element *vp* controls, together with the other triggers the combination or comparison circuit WGS15 and through the additional bistable triggers OW and OX connected to the outputs of said combination circuit WGS15 and the rectifier-resistance combination or connecting circuit WGS16, which of the two printers PRI or PRII is to operate in response to the particular signal being transmitted.

The distributor V2' accordingly must count up to fourteen so that the printer PRI or PRII may successively receive, besides the five intelligence elements of each of the two telegraph code signals to be recorded, a start element and a stop element at the beginning and end of each of said two five element intelligence signals. Since according to FIG. 9*b* the service signal Δ is only transmitted over the second of the two pair of letter signals, it correspondingly is only responsive to the triggers OE' through OJ' for controlling through circuit WGS15, the blocker or blocking device BI, thereby controlling whether the printing of the identical pair of letters which has been received is to be reprinted or not, as has been described above in connection with the circuit of FIG. 5*b*.

II–C. Multi-Channel Operations

By reference to any of the schematic time diagrams in this application previously described, there is illustrated considerable space or intervals between successive receptions and transmissions of the single signal channels disclosed, in that one signal is sent from station A to station B and a return signal is sent back from station B to station A before the next signal is sent from station A. Thus, in order to increase the propagation time of these systems the vertical time distances in these diagrams between successive signals, such as the double signals shown in FIG. 8 along the lines T1, R1, R2 and T2, may be filled-in by other channels without departing from the scope of this invention.

II–C–1. *Synchronous or asynchronous systems* a. THREE CHANNEL WITH VARIOPLEX

A schematic time diagram of the adaptation of a four tone synchronous or asynchronous varioplex system, similar to that shown in FIG. 8, but filled-in by three separate two-way channels A′, B′ and C′ consecutively, is disclosed for undisturbed transmission in FIG. 11. In order to accomplish this, each of the double signals in each channel is composed of eight elements instead of the seven elements shown in FIG. 8, the additional or eighth element, which, according to the different adjacent four or multi-frequency code system previously disclosed, may have three different frequencies and still be different from the frequency of the seventh element. This eighth element, then can indicate to which one of the three channels A′, B′ or C′, the signal of the other seven elements corresponds as well as acts as a synchronizing element, if necessary; the other seven elements being made up of the two letters of three elements each separated by the varioplex element *vp* as described in FIG. 8 for selection of which of two subscribers in each channel is to receive the signal. Thus, the eighth element of each of the double letter signals of each channel A′, B′ and C′ as disclosed in FIG. 11 insures that the double letters with which it is associated belong to a corresponding channel, and that the letters of the other channels will not be mixed up therewith. This is accomplished through trigger and rectifier-resistance circuits similar to those previously described.

As shown in dotted lines in FIG. 11, channel A′ from station A to station B and back from station B to station A, covers substantially the same time as that of the single channel disclosed in FIG. 8, however, in beween the time for station A to transmit a double signal in channel A′ and receive back a double signal in channel A′ from station B, separate double signals in two additional channels: B′ illustrated in dot-dash lines and C′ illustrated in dash and triple dot lines, have been transmitted from station A. Thus, while the correctly received double signal from station A in channel A′ is being converted into two seven-element telegraph signal (each consisting of a start element *st*, five intelligence elements 1 through 5, and a stop element *sp*) and being printed, two double signals in other channels B′ and C′ as well as the next double signal in channel A′ all from station A, have been received, so that as the last element *st* of the former transmitted double signal is printed, the first element *st* of the just received double signal in channel A′ is read for printing. The longer time required for conversion and printing of the telegraph signals than that for their transmission, thus is not wasted, in that other channels B′ and C′ may be interspersed and transmitted to other receivers and/or stations during this time.

In order to accommodate the two additional channels, the circuit diagrams shown in FIGS. 9 and 10 would have to be further enlarged, including additional bistable triggers for the additional or eighth element, additional rectifier-resistance or connecting circuits, as well as additional bistable trigger memory means, and three pairs of printers, one pair corresponding to each of the three channels A′, B′ and C′ at each receiver at each station. Correspondingly, each transmitter would be fed by three separate tapes through three separate keyers St′, and connected together for transmission over a common transmitter RZ.

II–C–1–b. SIX CHANNEL WITHOUT VARIOPLEX

If the intermediate element of the eight elements in each channel shown in FIG. 11 were not employed for varioplex operation as disclosed in detail in the descriptions of FIGS. 8, 9 and 10, and it were employed together with the eighth element also for indicating a different and corresponding channel, instead of just selecting one of two subscribers for one channel, it would then be possible with the two variations for the intermediate or fourth element and the three variations for the last or eighth element, to provide six different possible indications for each of six different signal channels, all of which could be transmitted between two stations over the same transmitter and receiver circuits without departing from the scope of this invention. A schematic signal time diagram of such a six channel system is shown in FIG. 12 for the two-way channels A′, B′, C′, D′, E′ and F′, which diagram is for an undisturbed transmission similar to the diagrams in FIGS. 8 and 11. The space of about one element duration shown between each channel permits time for restoration of the error detecting device to normal. Thus, the fourth and eighth elements of each channel signal of double letters indicates the particular channel for the two letters associated therewith on the remaining pair of three elements, so that each channel has a different combination of its fourth and eighth elements.

For the purpose of illustration, all the signals in the first channel A′ are shown connected by dotted lines in FIG. 12 to distinguish it from the other five signal channels shown. In order to scan and reproduce for recordation each of the elements of each channel as it is received, separate storing or memory trigger circuits are provided for each channel in the receiver of each station, because of the difference in time between the transmission of the eight elements of about five milliseconds duration each, and that of recording the fourteen telegraph code elements of over three times that duration each.

II–C–2. *Synchronous systems* a. EIGHT CHANNEL TWINPLEX (SIMULTANEOUS TRANSMISSION OF TWO ELEMENTS, ONE FROM EACH OF TWO SYMBOLS)

Referring now to FIGS. 13 and 14, there is disclosed a different embodiment for the transmission of two letters by each seven element signal and simultaneously transmitting two elements, one from each letter by means of a single frequency. This operation then may be adapted to an eight channel synchronous system with each of the channels having the possibility of selecting one out of four different subscribers, so that each channel also has a varioplex operation and the system thus has a capacity of 32 subscribers.

An illustration of how the two letters or symbols are transmitted over each seven element signal is disclosed in FIG. 14, in which the seven elements of the two separate letters are written vertically and the adjacent horizontal elements of each letter are transmitted simultaneously. Thus, there is a simultaneous transmission instead of a sequential transmission of each of the two letters, or double symbols according to the prior described asynchronous systems herein. This is possible since the present system is a synchronous system and a difference between the frequencies of adjacent transmitted elements is not required as in the previously described multi-frequency code systems. Thus, with four different tones or frequencies such as 1, 2, 3 and 4, respectively, these tones may correspond to the four different possible horizontal combinations of XX, OO, OX, and XO, respectively, and the transmission of the two letters shown in FIG. 14 (which correspond to the letters "G" and "H" of a standard seven unit code) would be composed of the successive tones 1,4, 3, 2, 2, 2 and 1, each of which tones may have a duration of about 5.4 milliseconds. With eight of these double letter signals being transmitted according to FIG. 13, one for each of the eight channels, a time interval lasting say up to 300 milliseconds between each repetition cycle or group of the eight channels may be provided, leaving $300-2\times7\times5.4=225$ milliseconds available propagation time, which is amply sufficient for the furthest earth communication.

Since this system is a synchronous system, a synchronizing signal is transmitted as a special signal Δ on the first of one of the eight pairs of signals transmitted in each group of channel signals, which special synchronizing signal may be combined with one of four letter signals, such as A through D, forming a "twinplex" signal, and also for indicating the selected varioplex subscriber of the four subscribers corresponding to A through D. Before another special synchronizing signal Δ occurs in this channel, seven pairs or fourteen letter signals are transmitted, namely, letters AB, CD, EF, etc., as shown along column T1 of station A in FIG. 13. However, the next synchronizing special signal Δ followed by a selecting letter (E/H) is transmitted from station A in the next or second channel in the second group of eight channels, so that the synchronizing selecting signal pair of symbols is continuously rotated through the system every eight groups of eight channel signals and out of each consecutive nine transmission intervals only one is not available for transmitting messages. Also every fourteen signals, or every eighth group of eight channels, the particular varioplex subscriber to which that channel has been directed may be changed, by changing the letter following the special synchronizing signal Δ to one of its three other possible selecting letters. Thus, the previous reference in section II–B–1 regarding an additional or a second special signal pulser Δ in FIG. 9*a*, is necessary according to the system disclosed in FIG. 13.

Referring to FIG. 13, the transmitter T1 from station A first transmits a synchro-selecting signal ΔA/D, herein for example subscriber ΔB, which after it is correctly received at the receiver R2 of station B, permits at least the following fourteen letter signals or seven double signals in the first channel, such as A—B, C—D, E—F, etc., to be transmitted in each channel group and to be destined for and selected by the subscriber B, and to continue so until a different synchro-selecting signal for another subscriber A, C or D, that is ΔA, ΔC or ΔD is transmitted in the twinplex signal location when it next appears in the first channel position A/D.

Similarly, the second channel in each group of eight channels transmits a special signal Δ in combination with a subscriber selecting letter E to H, which is shown to be received at position IV in the receiver R2, and which if correctly received will permit the start of the next fourteen or seven pairs of letters or symbols to be transmitted in this second channel from its successive positions II, III, etc., along transmitter column T1. The next synchro-selecting signal ΔI/L occurs in the third channel of the third group, and so on through the cycle for rotating the synchronizing and selecting signal pair once in each successive group in a different channel.

In the opposite direction the proceedings are entirely analogous, one of the subscribers *a/d* being selected by the synchro-selecting signal in the first channel emission from the transmitter T2, and so forth.

Thus the use of the special signal Δ as the first of the two symbols or pair of letters transmitted simultaneously according to this system of FIGS. 13 and 14, not only controls synchronization of the system but also permits varioplex selection of subscribers. Accordingly, combining the features of the system of FIGS. 13 and 14 with the circuitry previously described herein, it may be stated that, for example, a signal "AA" means "repeat," a signal "AΔ" means to print "AA", and a signal "ΔA" means to "direct the next signal to the printer corresponding to the subscriber A.

This system presents various advantages over previous known systems, namely:

(1) Loss of synchronism between stations can never result in the loss or doubling of the characters of symbols;

(2) It is impossible that the letters are inter-changed since this would be possible only if the group symbol itself was mutilated, and then blocking would occur as the receiver knows where to expect the next group symbol according to the combination of the synchro-selecting signals rotated through the channels;

(3) The repetition cycle has two steps;

(4) There is a possibility of applying the over-test principle to this system;

(5) Counting marks as possible fault detection is adaptable to this system; and (6) The channels repeat independently from one another so that an error in one channel does not result in a loss of time or letters in any of the other channels; that is, only the one channel in which the error occurs are two letters repeated.

II–D. Separate Symbol Repetition (A Synchronous System)

In order to further reduce the repetition cycle, the double sequential symbol transmission systems of this invention may be adapted to repeat only one of the two or pair symbols transmitted if the other one of the pair has been correctly received, at least under certain conditions. This has been found to be possible by stopping the transfer to the printer and actuating the repetition devices on the transmitters to re-transmit only those symbols suppressed, and stopping the supply of new symbols to the transmitters as long as the repetitioned devices are active. The circuits for accomplishing this are analogous to those described above.

FIG. 15 schematically shows a seven unit synchronous system in which two letter characters are transmitted sequentially as a group and are principally treated by the repetition device as a single character as the system in FIG. 6 above, with the following restrictions:

As illustrated in FIG. 15, *y/z* is assumed to have been correctly received on the receiver R1. As soon as "*y*" has been received, transmitter T1 transmits its letter A signifying to station B that the "*y*" had been correctly received and that station B may proceed to the emission of the first letter of the following group, being "*a*." On the reception of *z* by receiver R1, transmitter T1 will emit letter "B," but this is assumed to be incorrectly received at receiver R2, as shown by a cross. Consequently from this unit on, two successive characters will be blocked on receiver R2 as shown by a vertically extended rectangle instead of the previous character of the same signal pair as in the system of FIG. 6. A second consequence is that transmitter T2 will emit the special signal Δ instead of the letter "*b*" to request repetition of the letter "B" and start a repetition cycle at station "B" of two signals or letters which are not of the same pair or group. By the time station A receives the special signal "Δ" requesting repetition, the letter "C" has already been transmitted from station A, because it correctly received the letter "*a*" from station B. Therefore on reception of the service signal "Δ," station A transmits once more the second signal "B" of the preceding pair or group "AB" as the second signal of the present pair or group "CB," and the printer is blocked on reception of this service signal "Δ." At station B the reception of the letter "C" is blocked because the repetition cycle has not yet been completed, so it is not printed, and the repeated letter "B," which is now correctly received, is printed by receiver R2 after the cessation of the blocking cycle.

On receiver R1 the arrival of the special signal Δ had resulted in the blocking of the printer during two characters as shown by another vertically extended rectangle. The reception of the second letter "*a*" from transmitter T2 falls within this blocking cycle and is not printed, in that this transmitter T2 is repeating the *ab* group under the control of its repetition device, as the first "*ab*" emission had been changed in the interest of signalling to receiver R1 the loss of the character "B." The second "*b*" from transmitter T2 is now received on receiver R1 after the cessation of its blocking cycle, and accordingly it will be correctly printed. The transmitter T1 will now repeat the group CD, initiated by the correct reception of the second "*a*," which is only blocked to the printer.

Next, the correct reception of "CD" is supposed, followed by emission of "*cd*" from transmitter T2 which, however, is supposed to be lost. The fact of the non-arrival of characters "*cd*" on receiver R1 will be signified by transmitter T1 by the repetition, according to this invention, of the entire previous group, that it, characters "CD," supposed to have been correctly received. This repetition of "CD" is suppressed at station B as being old news, but it causes the repetition by transmitter T2 of the previous group "*cd*," which is now supposed to arrive correctly on receiver R1. This correct reception of "*cd*" at station A initiates the transmission of group "EF," of which the letter "E" is supposed to be lost, resulting in the transmission for a third time by transmitter T2 of group "*cd*." The reception of this "*cd*" by station A is suppressed, as indicated by the short rectangle, however not before having given rise to the repetition of the group EF, of which the "E" had been lost.

The grouping of letters in pairs is done in this case to obtain sufficient propagation time. The transmission is by on-off e.g. and the particular feature of this manner of operation is first, that repetition is initiated not only on arrival of a repeat group, but also on the arrival of a signal Δ in the second letter allotment (case of a signal Δ in FIG. 15), this being the manner of indicating an error on the second received symbol of a pair or group, and occasioning the repetition of the second letter of a pair only, the first one being suppressed in the repetition cycle (i.e. first attempted transmission of the letters CD). Some advantages of this system with respect to known systems are the reduction of the repetition cycle by one step and simplification of the work by an attendant.

If in this system the same group of two letters is to be transmitted twice, the first of the two letters of the repeated or second group is converted into a special or service signal before the second group is transmitted.

In FIG. 15 it has been assumed, that the propagation time is exactly equal to half the interval between signal emissions, less the time for two symbols. This is the case for the longest distance that such a system is operable at the given signal propagation cycle. It means, that the inclined line from station A transmitter T1 to the receiver R2 at station B, or the time at which the letter "A" arrives at station B coincide exactly with the time that the symbol "*a*" is started from the transmitter T2 at station B, and that the moment at which the letter "*a*" is received at the receiver R1 in station A will coincide with the start of the first letter C of the next symbol pair from transmitter T1.

In FIG. 16 the case is shown for the same synchronous system but with a shorter distance between stations A and B. The situation in slave station B with regard to the relative phases of receiver R2 and transmitter T2 is exactly the same as that for the system of FIG. 15, but in master station A of FIG. 16 the excess propagation time available is taken up by a relative shift of the phases of between the arrival of the letter "*a*" at the receiver R1 and the transmission of the next double symbol from transmitter T1. For the sake of uniformity, the circuit and the manner of operation is the same as in FIG. 15.

II–E. NETWORK OPERATIONS (A SYNCHRONOUS OR AN ASYNCHRONOUS SYSTEM)

FIGS. 17 and 18 schematically show a system having one central station (FIG. 17) having transmitting and receiving device AS and a number of substations, one of three of which are shown schematically in FIG. 18 having a receiving and transmitting device ASA. The transmitter of the central station emits on a frequency, to which the receivers of all sub-stations are equally tuned. The central station may call one of the sub-stations by adequate positioning of switches S1*a* and S1*b* in FIG. 17, which are coupled together as shown. If switch S1*a* is on its first contact, the calling signal ΔA for sub-station A will go out from the calling signal generator at a preselected frequency only to the sub-station A shown in FIG. 18, and the coupled switch S1*b* will be positioned only so said central station can receive from sub-station A. This calling signal will result in its passage through the selected filter ΔA and the energization of relay R at the sub-station A, which in turn excites the sub-station transmitter T*r*A through the device ASA.

Each sub-station transmits on its own frequency and has a receiver O–A, O–B or O–C in the central station (FIG. 17) tuned to the same frequencies. The central station operates to transmit a succession of letters in order as permitted by the arrival of acknowledging signals from the sub-station, which in this manner of operation are the slave stations, the central station having made the call, being the master station.

A special feature of this network system is the possibility of a general call for all sub-stations from the central station by placing the switches S1*a* and S1*b* on their left hand or last contact corresponding to a separate frequency to which all the sub-stations are tuned through their respective filters ΔΔ (see FIG. 18), emitting a calling signal ΔΔ, resulting in the operation of all the relays R in all sub-stations A, B and C. Then only after reception of acknowledging signals from all sub-stations, will the next letter be emitted by the device AS at the central station in FIG. 17, which operation may be effected by a series connection through contacts on the receiving relays of all receivers O–A, O–B, O–C. Here again in this network system, the special service signal Δ may be employed on the first and/or second of each pair of symbols as mentioned in Section II–B–1 above, and the system of this invention prevents any participating station from printing a received signal that has already been correctly received, so that no confusion is liable to arise.

At the end of the message from the central station or at the end of the broadcast or general message, the central station will again return to a slave position. From this position any of the sub-stations A, B or C can initiate a call by switching to their master position, as described before in connection with FIG. 5*a* and FIG. 5*b* and calling via their corresponding transmitter such as T*r*A (see FIG. 18).

In the position of coupled switches S1*a* and S1*b* shown in FIG. 17, the central station will be sensitive to all calls on all frequencies, and as soon as information is received that a given sub-station desires communication, the coupled switches S1*a* and S1*b* are moved into their respective position, and operations continue as before, with the difference that a sub-station is now acting as the master and the central station is its slave, remaining insensitive to any call from any other sub-station as long as the initiating message lasts.

While there is described above the principles of this invention in connection with specific apparatus, it is to be clearly understood that this description is made only by way of example and not as a limitation to the scope of this invention.

What is claimed is:

1. In a multi-element code telecommunication system in which the signals are continuously and sequentially transmitted between two stations, certain of which adjacent sequential signals are identical, each station having an interconnected transmitter and receiver and an automatic error correction device, the improvement comprising: means at each transmitter for converting the second of identical sequential signals into a service signal, and means at each receiver responsive to said service signal for reproducing said second signal like the first of said sequence.

2. A system according to claim 1 wherein said means at each transmitter includes means for combining two symbols to form each of said signals, and said means at each receiver includes means for separately detecting each of said two symbols in each signal.

3. A system according to claim 2 wherein said service signal comprises only one of said two symbols comprising one signal.

4. A system according to claim 2 wherein said means at each transmitter includes means for transmitting an additional symbol element with each of said two symbols, and wherein said means at each receiver includes means responsive to said additional symbol element.

5. A system according to claim 4 wherein said means for transmitting said additional element includes means for varying said additional symbol element, and wherein said means for receiving said additional symbol element includes means for detecting the variances thereof.

6. A multi-channel system according to claim 4 wherein each transmitter includes means for transmitting a second additional symbol element with said two symbols in each signal including means for producing variances in said second additional symbol element, and means in each of said receivers for receiving said second additional symbol element including means for detecting said variances.

7. A system according to claim 1 including means at each station for initiating a message to convert it into a master station, and means at the other station receiving said message to convert it into a slave station whereby it can transmit messages only after reception of unmutilated signals from said master station.

8. A multi-channel system according to claim 1, wherein each signal of each channel comprises eight elements, and said system includes means for transmitting and receiving two successive symbols over said eight elements of each signal in each channel, thirty-six different symbols being communicable over the first three elements of each signal and thirty-six different symbols being communicable over the fifth, sixth and seventh elements of each signal, and the possibility of six different combinations of destinations for each signal of each channel according to the various alternate combinations of the fourth and eighth elements of each signal.

9. A multi-channel system according to claim 1 wherein said channels comprise a group of signals one from each channel, one of said signals in each group comprising a special synchronizing symbol in combination with a selecting symbol for that channel.

10. A system according to claim 9 including distributor means at each station for the signals of each channel, and means responsive to said special synchronizing symbol for synchronizing said distributor.

11. A network of stations according to the system of claim 1 including: a central station and a plurality of substations, selecting means at said central station for selecting successively any one and all of said slave stations, special signal generating means at the central station for calling each one and all of said sub-stations, and means at each sub-station for calling said central station.

12. A network of stations according to claim 11 wherein said special signal generating means includes means for generating a two symbol calling signal wherein one of said symbols corresponds to a special service symbol and the other of said symbols corresponds to a station identifying symbol, and wherein each receiver includes separate means responsive to said special service symbol and to said identifying symbol.

13. A network of stations according to claim 11 wherein said special signal generating means includes means for generating a two symbol calling signal wherein both symbols are special service symbols, and wherein each receiver includes separate means for receiving and detecting each separate service symbol of said calling signal.

14. A system according to claim 1 including means at each receiver for detecting reception of an incomplete signal, means responsive to said detecting means for causing its associated transmitter at one station to repeat the emission of its last emitted signal in order to request the repetition of said incomplete signal, and means at each receiver responsive to the receipt of the second of two identical signals for causing its associated transmitter at another station to repeat the emission of the last signal emitted from said other station.

15. In a two-way telecommunication system for a multi-element signal having at each station a transmitter and a receiver, each transmitter and each receiver having means for storing each element of said multi-element signal and each station having an automatic error correction device, the improvement comprising: a first detecting means in each receiver for detecting successively received identical multi-element sginals, connected means between the transmitter and receiver at each station for operating said error correction device in response to said first detecting means, means at each transmitter for repeating the transmission of a signal to indicate an error, a second detecting means in each transmitter connected to its corresponding signal element storing means for detecting sequentially identical signals for transmission, means at each transmitter responsive to said second detecting means for producing a special signal for the second one of said signals to be repeated, means at each transmitter for transmitting said special signals to indicate duplication of a previously transmitted signal, and means at each receiver connected to its corresponding signal element storing means for detecting said special signal and converting it into a repetition of the last received signal at that receiver.

16. A system according to claim 15 wherein said means for operating error detection device comprises a blocking circuit and a distributor circuit controlled by said blocking circuit at each receiver.

17. A system according to claim 15 wherein each signal comprises a pair of symbols transmitted successively in separated groups of elements making up said signal, and including means at each receiver responsive to the correct reception of the first symbol of a pair to indicate to its associated transmitter to start transmitting the first symbol of the next pair.

18. A multi-channel system according to claim 15 including: means for communicating successive similar groups of double symbol signals, one signal in each group corresponds to each channel, each group having one signal replaced by a synchronizing symbol and selecting symbol pair signal, and means for communicating said symbol pair signal in successive channels in successive groups, whereby each channel contains a synchronizing selecting signal every time a number of signals has been communicated corresponding to the number of channels in each group.

19. A system according to claim 15 wherein said first detecting means comprises a plurality of trigger circuits, one for each element of said multi-element signal.

20. A system according to claim 19 wherein said means for operating said error correction device comprises a pulser circuit and a rectifier-resistance combination comparison circuit connected to said trigger circuits and controlled by said pulser circuit.

21. A system according to claim 15 wherein said repeating means comprises a distributor and a rectifier-resistance combination circuit controlled by said distributor.

22. A system according to claim 15 wherein said means for producing said special signal comprises a special pulser circuit.

23. A system according to claim 22 wherein said means for producing said special signal includes a rectifier-resistance combination circuit, a plurality of trigger circuits corresponding to each element of said multi-element signal, and a corresponding plurality of condensers connected in parallel to control the operation of said special pulser circuit through said rectifier-resistance combination circuit.

24. A two-way telecommunication system between two stations in which messages are transmitted from a transmitter and received at a receiver at both stations comprising: means at the transmitter of each station for converting every alternate signal in a sequence of identical signals into a special service signal, means at the receiver at each station for converting said special service signal back into the original text, and means to request repetition of a mutilated signal by the retransmission of the previously correctly received signal from the station requesting said repetition.

25. A system according to claim 24 including a printer and means for operating the printer to print signals differing from the signals previously received except in the case of the repetition of said special service signal indicating successive identical signals.

26. A multi-channel system according to claim 24 wherein each said signal is a multi-element signal and said system includes a plurality of storing means for each of the elements in each signal of each channel, and a plurality of printers corresponding to each channel at each receiver.

27. A system according to claim 24 including: a switching means at each transmitter for changing said system from a synchronous system into an asynchronous system and vice versa, and a multi-vibrator means at each transmitter for controlling the sequence of transmission of signals from the transmitter that initiates a message.

No references cited.